(12) United States Patent
Kiffer et al.

(10) Patent No.: US 9,255,646 B2
(45) Date of Patent: Feb. 9, 2016

(54) EXCESS FLOW SHUTOFF VALVE

(71) Applicant: AIR PRODUCTS AND CHEMICALS INC., Allentown, PA (US)

(72) Inventors: Micah S. Kiffer, Kutztown, PA (US); Stephen Clyde Tentarelli, Schnecksville, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 293 days.

(21) Appl. No.: 13/930,474

(22) Filed: Jun. 28, 2013

(65) Prior Publication Data
US 2015/0000762 A1    Jan. 1, 2015

(51) Int. Cl.
F16K 17/22    (2006.01)
F16K 17/40    (2006.01)
F16K 17/28    (2006.01)

(52) U.S. Cl.
CPC .............. *F16K 17/406* (2013.01); *F16K 17/28* (2013.01); *F16K 17/22* (2013.01); *Y10T 137/1624* (2015.04); *Y10T 137/1677* (2015.04); *Y10T 137/7782* (2015.04); *Y10T 137/7785* (2015.04)

(58) Field of Classification Search
CPC ........................................ F16K 17/22
USPC ................. 137/68.17, 71, 498, 68.16
See application file for complete search history.

(56) References Cited

U.S. PATENT DOCUMENTS

| | | | | |
|---|---|---|---|---|
| 3,542,067 A * | 11/1970 | Douglas | ............... | 137/614.11 |
| 3,937,072 A * | 2/1976 | Huydts et al. | ............... | 73/852 |
| 3,968,813 A * | 7/1976 | Olmsted | ............... | 137/493 |
| 4,009,572 A * | 3/1977 | Cooper | ............... | 60/454 |
| 4,240,458 A | 12/1980 | Huff | | |
| 4,986,132 A * | 1/1991 | Calomino | ............... | 73/852 |
| 5,067,511 A | 11/1991 | Taylor | | |
| 5,311,898 A | 5/1994 | Taylor | | |
| 5,462,081 A | 10/1995 | Perusek et al. | | |
| 5,535,777 A * | 7/1996 | Maracchi | ............... | 137/458 |
| 5,810,057 A | 9/1998 | Westman | | |
| 6,131,599 A | 10/2000 | DeGood et al. | | |
| 6,484,742 B1 | 11/2002 | Brazier et al. | | |
| 6,488,044 B2 * | 12/2002 | Brazier et al. | ............... | 137/68.17 |
| 6,916,362 B2 | 7/2005 | Prasad et al. | | |
| 7,703,472 B2 | 4/2010 | Carolan et al. | | |
| 2014/0326336 A1 * | 11/2014 | Bruck et al. | ............... | 137/487.5 |

FOREIGN PATENT DOCUMENTS

FR    2581729 A1    11/1986

\* cited by examiner

*Primary Examiner* — John K Fristoe, Jr.
*Assistant Examiner* — Christopher Ballman
(74) *Attorney, Agent, or Firm* — Bryan C. Hoke, Jr.

(57) ABSTRACT

Excess flow shutoff valve comprising a valve body, a valve plug, a partition, and an activation component where the valve plug, the partition, and activation component are disposed within the valve body. A suitable flow restriction is provided to create a pressure difference between the upstream end of the valve plug and the downstream end of the valve plug when fluid flows through the valve body. The pressure difference exceeds a target pressure difference needed to activate the activation component when fluid flow through the valve body is higher than a desired rate, and thereby closes the valve.

16 Claims, 13 Drawing Sheets

EXCESS FLOW SHUTOFF VALVE

STATEMENT REGARDING FEDERALLY SPONSORED RESEARCH OR DEVELOPMENT

This invention was made at least in part with funding from the United States Department of Energy under DOE Cooperative Agreement No. DE-FC26-98FT40343. The United States Government has certain rights in this invention.

BACKGROUND

Excess flow shutoff valves are useful for automatically isolating pressurized lines when a component in the line is breached. Specifically, excess flow shutoff valves can be used if the line is under internal pressure and a component downstream of the valve fails or if the line is under external pressure and a component upstream of the valve fails.

Related disclosures include U.S. Pat. No. 4,240,458, U.S. Pat. No. 5,067,511, U.S. Pat. No. 5,462,081, U.S. Pat. No. 5,810,057, U.S. Pat. No. 6,131,599, U.S. Pat. No. 6,484,742, U.S. Pat. No. 6,916,362, and U.S. Pat. No. 7,703,472.

Industry desires excess flow shutoff valves suitable for use at high temperatures, e.g. between 600° C. and 1400° C.

Industry desires a compact and economical excess flow shutoff valve that can operate at higher temperatures than those that are currently available commercially.

Industry desires reliable excess flow shutoff valves that will not trip prematurely and will trip consistently at target flow rates.

Industry desires easily modified excess flow shutoff valves that can be easily modified to vary the target flow rate at which the valve trips.

Industry desires an excess flow shutoff valve that is sensitive to relatively small excess flow.

Some isolation devices intended for use at high temperatures are very large, primarily to keep the working parts isolated from the process fluid and at a lower temperature. Industry desires an excess flow shutoff valve which is small and can be installed in-line.

Industry desires an excess flow shutoff valve that has low pressure drop through the valve during normal operating conditions.

Industry desires an excess flow shutoff valve that provides a tight seal upon closing even when the process fluid contains debris.

Industry desires the capability to trip an excess flow shutoff valve on demand.

BRIEF SUMMARY

The present invention relates to an excess flow shutoff valve.

There are several aspects of the excess flow shutoff valve as outlined below. In the following, specific aspects of the excess flow shutoff valve will be outlined. The reference numbers and expressions set in parentheses are referring to an example embodiment explained further below with reference to the figures. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. An excess flow shutoff valve comprising:
a valve body (10) defining an internal volume and having an inlet port (16) and an outlet port (18);
a valve plug (20) having an upstream end (22) and a downstream end (24), the valve plug movable within the valve body (10) from a position that permits fluid to flow from the inlet port (16) to the outlet port (18) to a position that blocks fluid from flowing from the inlet port to the outlet port, the valve plug movable from the position that permits fluid to flow from the inlet port to the outlet port to the position that blocks fluid from flowing from the inlet port to the outlet port upon activation of an activation component (30);
a partition (50) disposed within the valve body (10), the partition (50) forming a first chamber (60) and a second chamber (65) within the internal volume of the valve body (10), wherein the valve plug (20) is disposed within the second chamber when the valve plug is in the position that permits fluid to flow from the inlet port (16) to the outlet port (18); and
the activation component (30) disposed within the valve body (10) and operatively connected to the valve plug (20) to hold the valve plug in place within the second chamber (65) in the position that permits fluid to flow from the inlet port (16) to the outlet port (18);
wherein at least one of the valve body (10) and the partition (50) define one or more orifices (55) for fluid flow from the first chamber (60) to the second chamber (65) when the valve plug (20) is in the position that permits fluid to flow from the inlet port (16) to the outlet port (18), the one or more orifices at a position downstream of the downstream end (24) of the valve plug when the valve plug is in the position that permits fluid to flow from the inlet port to the outlet port.

Aspect 2. The excess flow valve of aspect 1 wherein the first chamber (60) is defined by or by at least the inlet port (16), a portion (10a) of an inner surface of the valve body (10), a first surface (50a) of the partition (50), and the upstream end (22) of the valve plug (20) when the valve plug is in the position that permits fluid to flow from the inlet port to the outlet port (18), and the second chamber (65) is defined by at least the outlet port (18), a second surface (50b) of the partition (50), and the upstream end (22) of the valve plug (20) when the valve plug (20) is in the position that permits fluid to flow from the inlet port (16) to the outlet port (18).

Aspect 3. The excess flow valve of aspect 2 wherein the second chamber (65) is further defined by a second portion (10b) of the inner surface of the valve body (10).

Aspect 4. The excess flow shutoff valve of any one of aspects 1 to 3 wherein the one or more orifices (55) create a pressure difference between the upstream end (22) of the valve plug (20) and the downstream end (24) of the valve plug (20) when fluid flows through the valve body (10) from the inlet port (16) to the outlet port (18), wherein the pressure difference is less than a target pressure difference for activating the activation component (30) when the fluid flows through the valve body (10) at a lower rate, which is less than a target flow rate, and the pressure difference exceeds the target pressure difference for activating the activation component (30) when the fluid flows through the valve body (10) at a higher rate, which is greater than the target flow rate.

Aspect 5. The excess flow valve of any one of aspects 1 to 4 wherein the second chamber (65) is formed between the partition (50) and an inner surface of the valve body (10).

Aspect 6. The excess flow valve of any one of aspects 1 to 4 wherein the second chamber (65) is formed within the partition (50), the second chamber (65) defined by or by at least an inner surface of the partition (50), the outlet port (18), and the upstream end (22) of the valve plug (20) when the valve plug (20) is in the position that permits fluid to flow from the inlet port (16) to the outlet port (18).

Aspect 7. The excess flow shutoff valve of any one of aspects 1 to 6 wherein the activation component (30) is selected from the group consisting of a pin (30*a*), a deformable link (30*b*), and combinations thereof.

Aspect 8. The excess flow shutoff valve of any one of aspects 1 to 9 wherein the activation component comprises a deformable link (30*b*), the deformable link (30*b*) having a creep characteristic such that the deformable link (30*b*) creeps sufficiently slowly when the pressure difference is less than the target pressure difference occurring between the upstream end (22) of the valve plug (20) and the downstream end (24) of the valve plug (20) thereby holding the valve plug (20) in the position that allows fluid to flow from the inlet port (16) to the outlet port (18) for a first target time period when the pressure difference is less than the target pressure difference, and such that the deformable link (30*b*) creeps sufficiently quickly upon the pressure difference exceeding the target pressure difference occurring between the upstream end (16) of the valve plug (20) and the downstream end (24) of the valve plug (20), wherein upon the deformable link (30*b*) creeping, the valve plug (20) is caused to move to the position that blocks fluid from flowing from the inlet port (16) to the outlet port (18) within a second target time period.

Aspect 9. The excess flow shutoff valve of any one of aspects 1 to 8 wherein the activation component comprises a pin (30*a*), the pin having a strength such that the pin will break upon the pressure difference exceeding the target pressure difference occurring between the upstream end (22) of the valve plug (20) and the downstream end (24) of the valve plug (20), wherein upon the pin (30*a*) breaking, the valve plug (20) is caused to move to the position that blocks fluid from flowing from the inlet port (16) to the outlet port (18).

Aspect 10. The excess flow shutoff valve of any one of aspects 1 to 7 wherein the activation component comprises a pin (30*a*) and a deformable link (30*b*), the pin (30*a*) having a strength such that the pin (30*a*) will break upon the pressure difference exceeding the target pressure difference occurring between the upstream end (22) of the valve plug (20) and the downstream end (24) of the valve plug (20), the deformable link (30*b*) having a creep characteristic such that the deformable link (30*b*) will creep when the pressure difference exceeds a second target pressure difference occurring between the upstream end (22) of the valve plug (20) and the downstream end (24) of the valve plug (20),
  wherein the pin (30*a*) and the deformable link (30*b*) are operatively disposed such that the pin (30*a*) initially holds the valve plug (20) in place within the valve body (10) in the position that permits fluid to flow from the inlet port (16) to the outlet port (18),
  wherein upon the pin (30*a*) breaking, the valve plug (20) is restrained by the deformable link (30*b*), wherein upon the deformable link (30*b*) creeping, the valve plug (20) is caused to move to the position that blocks fluid from flowing from the inlet port (16) to the outlet port (18) within a target time period.

Aspect 11. The excess flow shutoff valve of any one of aspects 1 to 10 further comprising:
  a flow deflector (40) disposed within the valve body (10), the flow deflector (40) positioned in the first chamber (60) downstream of the inlet port (16) of the valve body (10) and upstream of the upstream end (22) of the valve plug (20) for deflecting fluid that enters through the inlet port (16) of the valve body (10) away from the upstream end (22) of the valve plug (20).

Aspect 12. The excess flow shutoff valve of any one of aspects 1 to 11 wherein the partition (50) comprises a ceramic lining (57) covering at least a portion of the inside of the partition (50).

Aspect 13. The excess flow shutoff valve of any one of aspects 1 to 12 wherein the partition (50) defines the one or more orifices (55), the one or more orifices (55) providing a flow restriction to create the pressure difference between the upstream end (22) of the valve plug (20) and the downstream end (24) of the valve plug (20) when fluid flows through the valve body (10).

Aspect 14. The excess flow valve of any one of aspects 1 to 13 wherein the partition (50) has a side facing the valve plug (20) and a side facing away from the valve plug (20), and wherein the partition (50) comprises a ceramic layer (57) forming at least a portion of the side adjacent the valve plug (20), and the one or more orifices (55) are formed in the ceramic layer (57) of the partition (50).

Aspect 15. The excess flow valve of any one of aspects 1 to 14 wherein the partition (50) has a side facing (adjacent) the valve plug (20) and a side facing away from (opposite) the valve plug (20), and wherein the partition (50) comprises a sleeve (59) forming at least a portion of the side facing away from the valve plug (20), and the one or more orifices (55) are formed in the sleeve.

Aspect 16. The excess flow shutoff valve of any one of aspects 1 to 15 wherein the one or more orifices (55) are sized to provide a pressure difference, the pressure difference sufficient to activate the activation component (30) when the flow rate through the flow restriction exceeds the target flow rate. The pressure drop sufficient to trigger the activation component (30) may be greater than 6900 Pa, for example.

Aspect 17. The excess flow shutoff valve of any one of aspects 1 to 16 wherein the activation component (30) comprises a pin (30*a*), the pin loaded in bending, wherein the pin holds the valve plug (20) in place within the valve body (10) when the valve plug (20) is in the position that permits fluid to flow from the inlet port (16) to the outlet port (18).

Aspect 18. The excess flow shutoff valve of aspect 17 wherein the pin (30*a*) is supported by the partition (50) when the pin holds the valve plug (20) in place within the valve body (10) in the position that permits fluid to flow from the inlet port (16) to the outlet port (18).

Aspect 19. The excess flow shutoff valve of aspect 17 or aspect 18 wherein the pin is in a 3 point bending configuration.

Aspect 20. The excess flow shutoff valve of aspect 17 or aspect 18 further comprising a spreader beam (35) mechanically connecting the valve plug (20) to the pin thereby putting the pin in a 4 point bending configuration.

Aspect 21. The excess flow shutoff valve of any one of aspects 1 to 20 further comprising a gasket (80; 81), the gasket (80; 81) positioned to form a seal between the valve plug (20) and at least one of the valve body (10) and the partition (50) when the valve plug (20) is in the position that prevents fluid from flowing from the inlet port (16) to the outlet port (18).

Aspect 22. The excess flow shutoff valve of aspect 21 wherein the downstream end (24) of the valve plug (20) has a perimeter that concentrates contact stress and deforms the gasket (80) when the valve plug (20) moves to the position that prevents gas from flowing from the inlet port (16) to the outlet port (18).

Aspect 23. The excess flow shutoff valve of any one of aspects 1 to 22 further comprising:
  a gasket (81) positioned in a groove in the valve plug (20);
  a valve seat (90); and a second gasket (95) proximate the outlet port (18) of the valve body (10);

wherein the valve seat (90) is positioned to form a seal with the gasket (81) when the valve plug (20) is in the position that prevents fluid from flowing from the inlet port (16) to the outlet port (18), and wherein the second gasket (95) is positioned between the valve seat (90) and the valve body (10) to provide a seal between the valve seat (90) and the valve body (10).

Aspect 24. The excess flow shutoff valve of any one of aspects 1 to 23 further comprising an activating fluid injection passage (100) disposed for injecting an activating fluid at the upstream end (22) of the valve plug (20).

Aspect 25. The excess flow shutoff valve of aspect 24 wherein the upstream end (22) of the valve plug (20), a flow deflector (40), and the partition (50) form a space (52) disposed for receiving the activating fluid from the activating fluid injection passage (100), and the partition (50) and the deflector (40) form a flow-restricting gap (70) therebetween disposed to restrict flow of the activating fluid out of the space (52).

Aspect 26. The excess flow shutoff valve of claim 1 wherein the valve plug (20) has one or more circumscribing ribs (25).

Aspect 27. The excess flow shutoff valve of any one of aspects 1 to 26 wherein the valve plug (20) is caused to move to the position that blocks fluid from flowing from the inlet port (16) to the outlet port (18) by gravitational force.

Aspect 28. The excess flow shutoff valve of aspect 17 or aspect 18 wherein the pin is in a n-point bending configuration, with n≥3.

Aspect 29. The excess flow shutoff valve of any one of aspects 1-28 wherein the first chamber (60) comprises a first space connecting the inlet port (16) and the orifices (55) and a second space (52) which branches-off from the first space to direct fluid to the upstream end (22) of the valve plug (20) for exerting a fluid pressure on the valve plug towards the position that blocks fluid from flowing from the inlet port (16) to the outlet port (18).

Aspect 30. The excess flow shutoff valve of any one of aspects 1-29 wherein the valve plug (20), when in the position that permits fluid to flow from the inlet port (16) to the outlet port (18), separates the first chamber (60) from the second chamber (65) to such an extent that a pressure difference between the upstream end (22) of the valve plug (20) and the downstream end (24) of the valve plug (20) is created when fluid flows from the inlet port (16) to the outlet port (18) of the valve body (10).

DETAILED DESCRIPTION OF THE PREFERRED EMBODIMENTS

Figure 1:
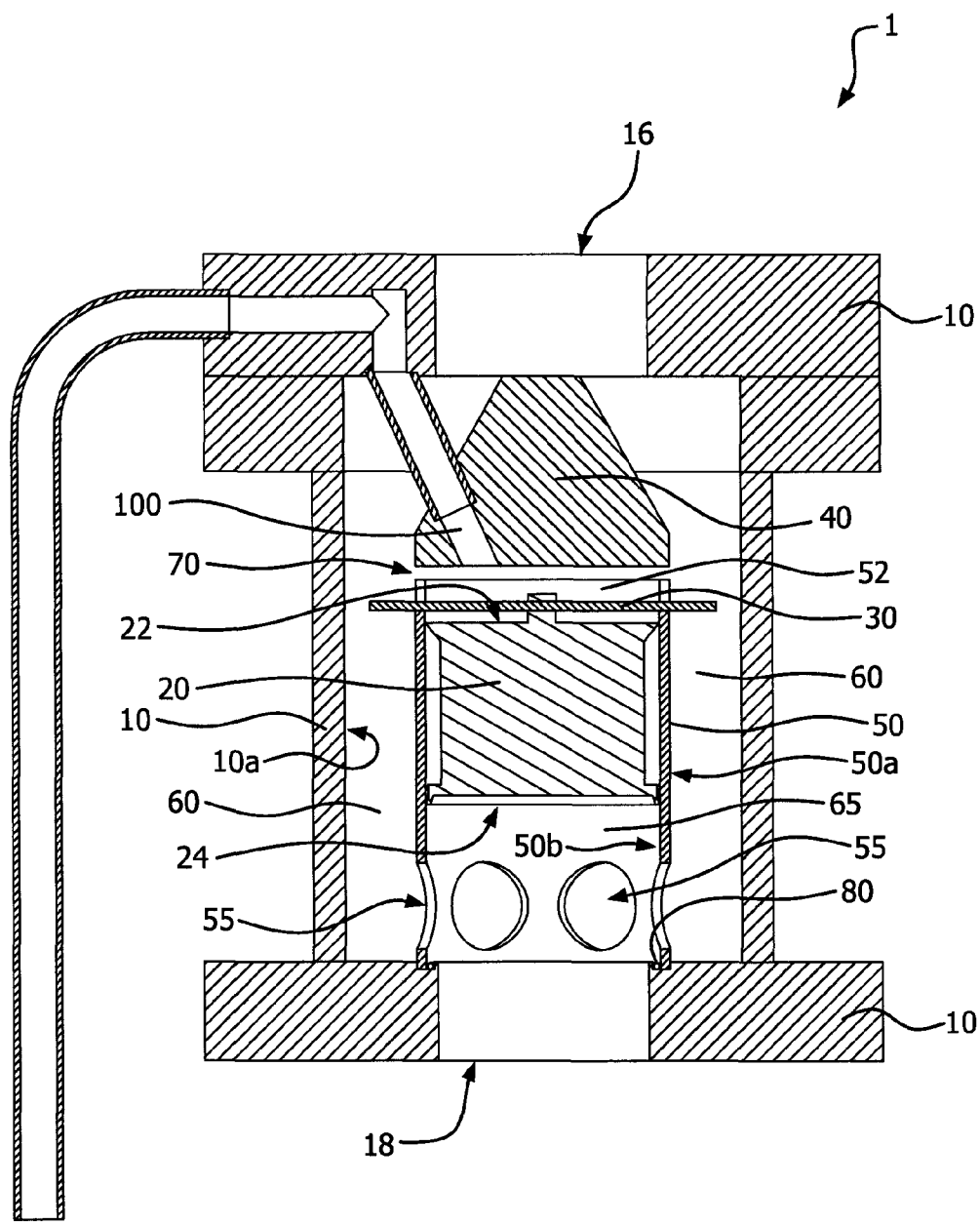
FIG. 1 illustrates a cross-sectional view through an excess flow shutoff valve with the valve plug in the position that permits fluid to flow from the inlet port to the outlet port (i.e. in an open configuration).

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of the first entity, (2) the second entity, and (3) the first entity and the second entity. The term "and/or" placed between the last two entities of a list of 3 or more entities means at least one of the entities in the list including any specific combination of entities in this list.

In order to aid in describing the invention, directional terms may be used in the specification and claims to describe portions of the present invention (e.g., upper, top, lower, bottom, left, right, etc.). These directional terms are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

Downstream and upstream refer to the intended flow direction of the process fluid transferred. If the intended flow direction of the process fluid is from the first device to the second device, the second device is in downstream fluid flow communication of the first device.

As used herein, the term "fluid" includes gases and liquids. The fluid may be a gas. The fluid may be a liquid.

The present disclosure relates to an excess flow shutoff valve which is an automatic shutoff valve that isolates a conduit when the flow rate is greater than a desired threshold flow rate.

Figure 2:
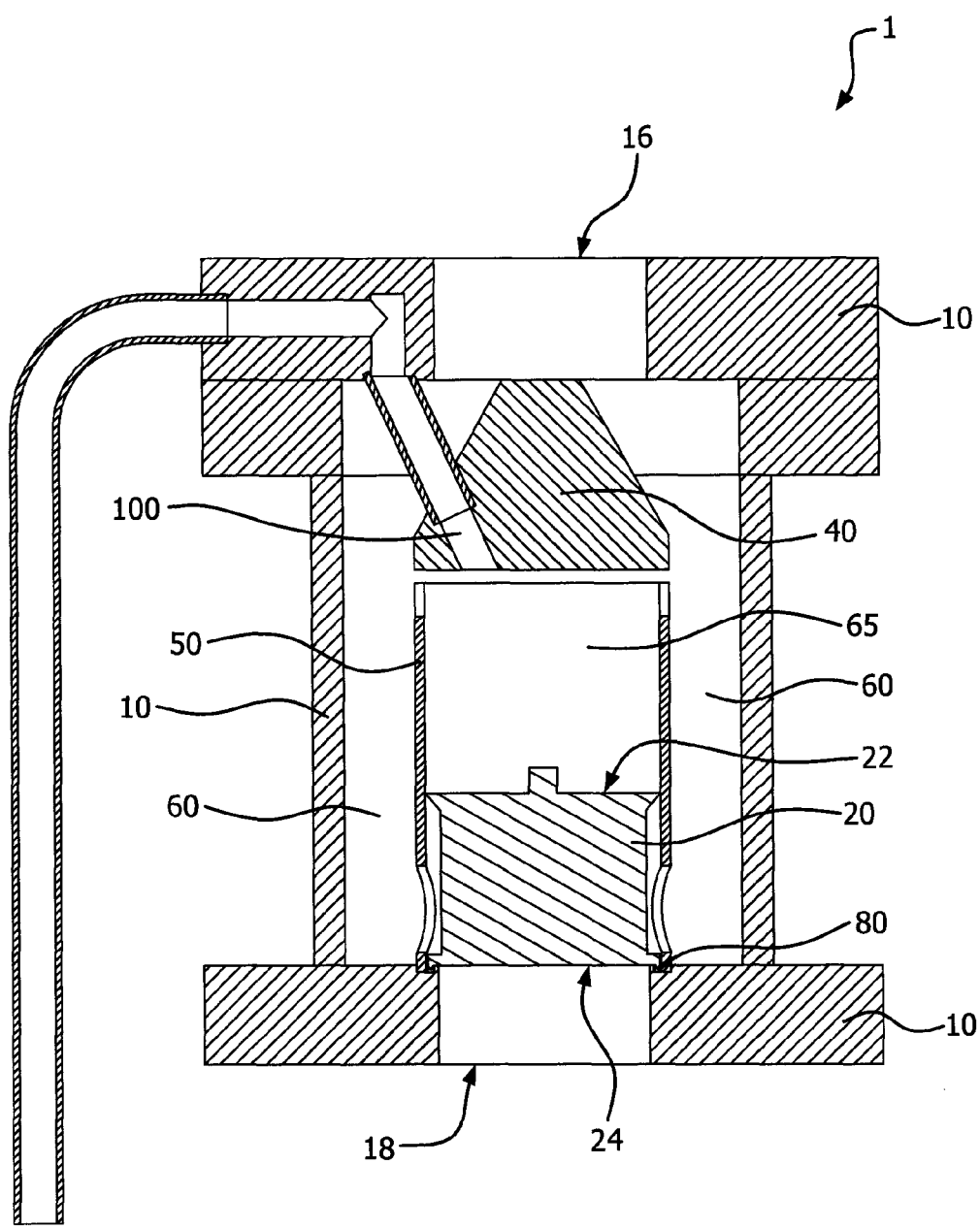
FIG. 2 illustrates a cross-sectional view through an excess flow shutoff valve with the valve plug in the position that blocks fluid from flowing from the inlet port to the outlet port (i.e. in the closed configuration).
Figure 3:
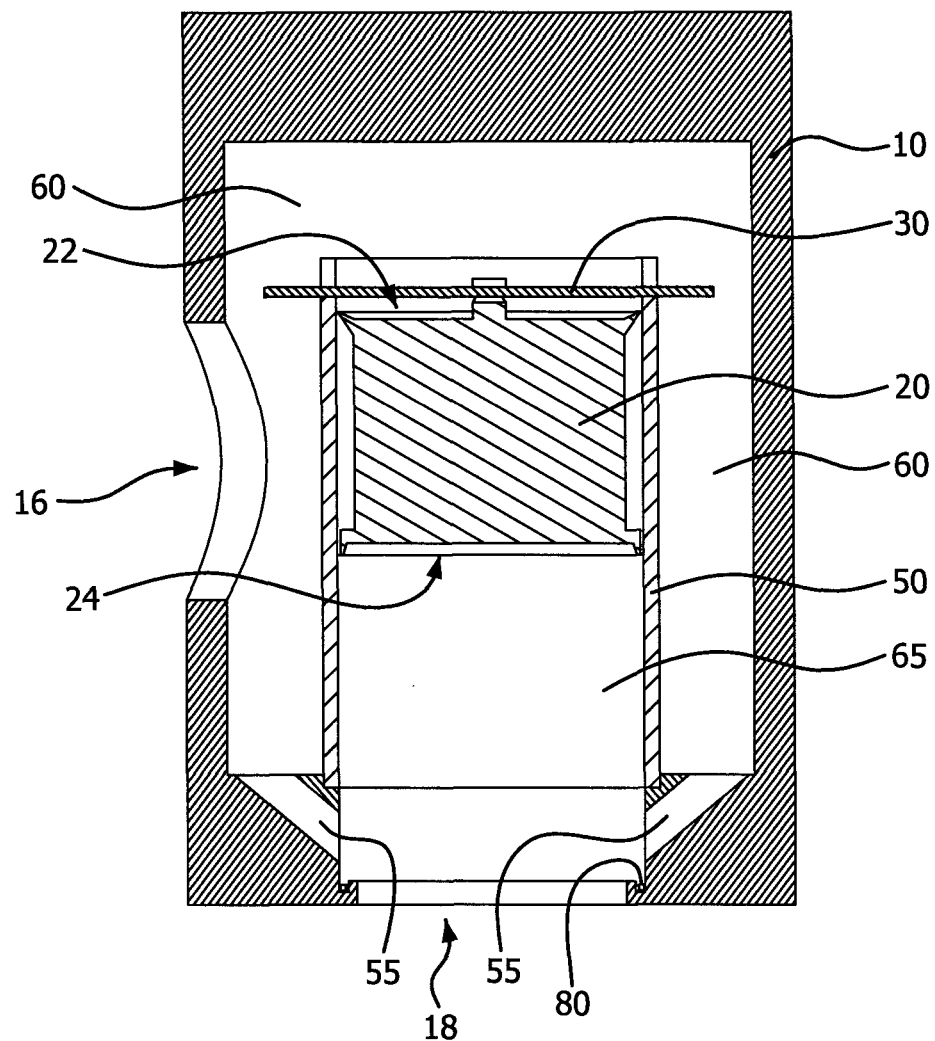
FIG. 3 illustrates a cross-sectional view through an excess flow shutoff valve with the inlet port at a right angle to the outlet port and orifices in the valve body.

Referring now to the drawings, wherein like reference numbers refer to like elements throughout the several views, FIG. 1 shows a cross sectional view through an excess flow shutoff valve 1 in the open configuration, and FIG. 2 shows a cross-sectional view through an excess flow shutoff valve 1 in the closed configuration. The excess flow shutoff valve comprises a valve body 10 having an inlet port 16 and an outlet port 18. The inlet port and outlet port may be at opposite ends of the valve body 10 as shown in FIG. 1, at a right angle to each other as shown in FIG. 3, or at any desired angle.

The valve body 10 defines an internal volume, which houses internal components of the valve. The valve body must contain the operating pressure load in both the open and closed configurations. The valve body may have a circular cross section or any other desired cross section. The valve body may be made of any material having suitable strength and oxidation resistance for the desired service. For the case of oxygen production using ion transport membranes, the valve body should be made from materials compatible with high temperature oxygen. At 700-950° C., preferred materials may include Incoloy® 800H, Inconel® 600, Inconel® 601, RA 602CA®, RA 253MA®, Hastelloy® X, Haynes® 230, and RA 330®. For oxygen service at lower temperatures, 300 series stainless steels may be preferred. The inlet end of the valve body may be removable from the rest of the valve in order to access and maintain the excess flow shutoff valve. The excess flow shutoff valve may have connectors or couplings at the inlet end and the outlet end in order to remove the entire valve body from the adjoining piping system for maintenance.

The excess flow shutoff valve comprises a valve plug 20 disposed within the valve body 10. The valve plug 20 has an upstream end 22 and a downstream end 24. The valve plug 20 is movable within the valve body 10 from a position that permits fluid to flow from the inlet port 16 to the outlet port 18 to a position that blocks fluid from flowing from the inlet port 16 to the outlet port 18.

The valve plug 20 may be hollow to reduce the weight of the valve plug. The valve plug may be filled with sand or other granular material to dampen movement of the valve plug and/or reduce vibrations of the valve plug.

The excess flow shutoff valve comprises a partition 50 disposed within and in fixed spaced relation to the valve body 10. The partition 50 is positioned between the inlet port 16 of the valve body 10 and outlet port 18 of the valve body 10. The partition 50 forms a first chamber 60 and a second chamber 65 within the internal volume of the valve body 10. The valve plug 20 is disposed within the second chamber 65 when the valve plug 20 is in the position that permits fluid to flow from the inlet port 16 to the outlet port 18.

The valve plug 20 may be disposed within the partition 50 as shown in FIG. 1 and FIG. 3. In this case, the first chamber 60 may be defined by the inlet port 16, a portion 10a of an inner surface of the valve body 10, a first (outer) surface 50a of the partition 50, and the upstream end 22 of the valve plug 20 when the valve plug 20 is in the position that permits fluid to flow from the inlet port 16 to the outlet port 18. The second chamber 65 may be defined by at least the outlet port 18, a second (inner) surface 50b of the partition 50, and the upstream end 22 of the valve plug 20 when the valve plug 20 is in the position that permits fluid to flow from the inlet port 16 to the outlet port 18.

Figure 4:
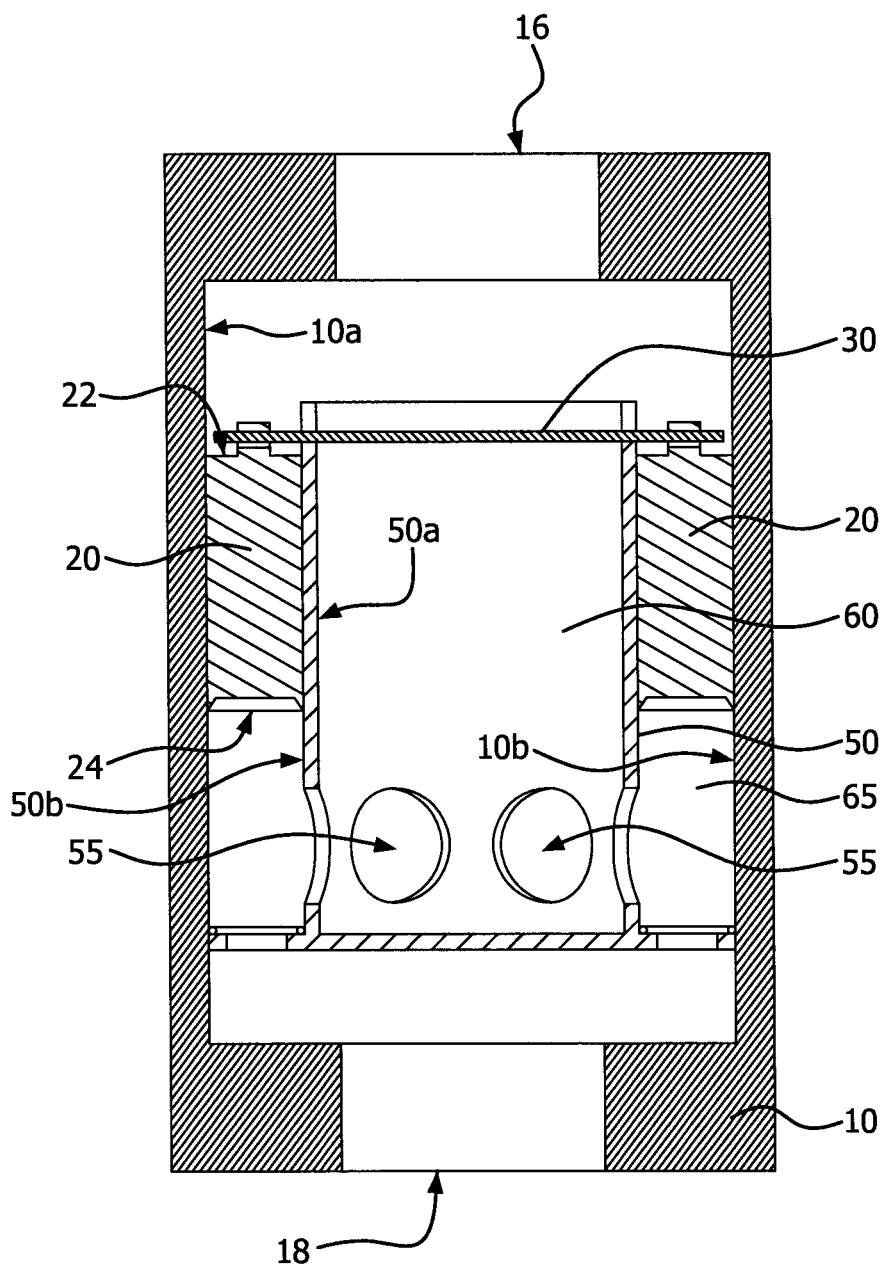
FIG. 4 illustrates a cross-sectional view through an excess flow shutoff valve with a ring-shaped valve plug.
Figure 5:
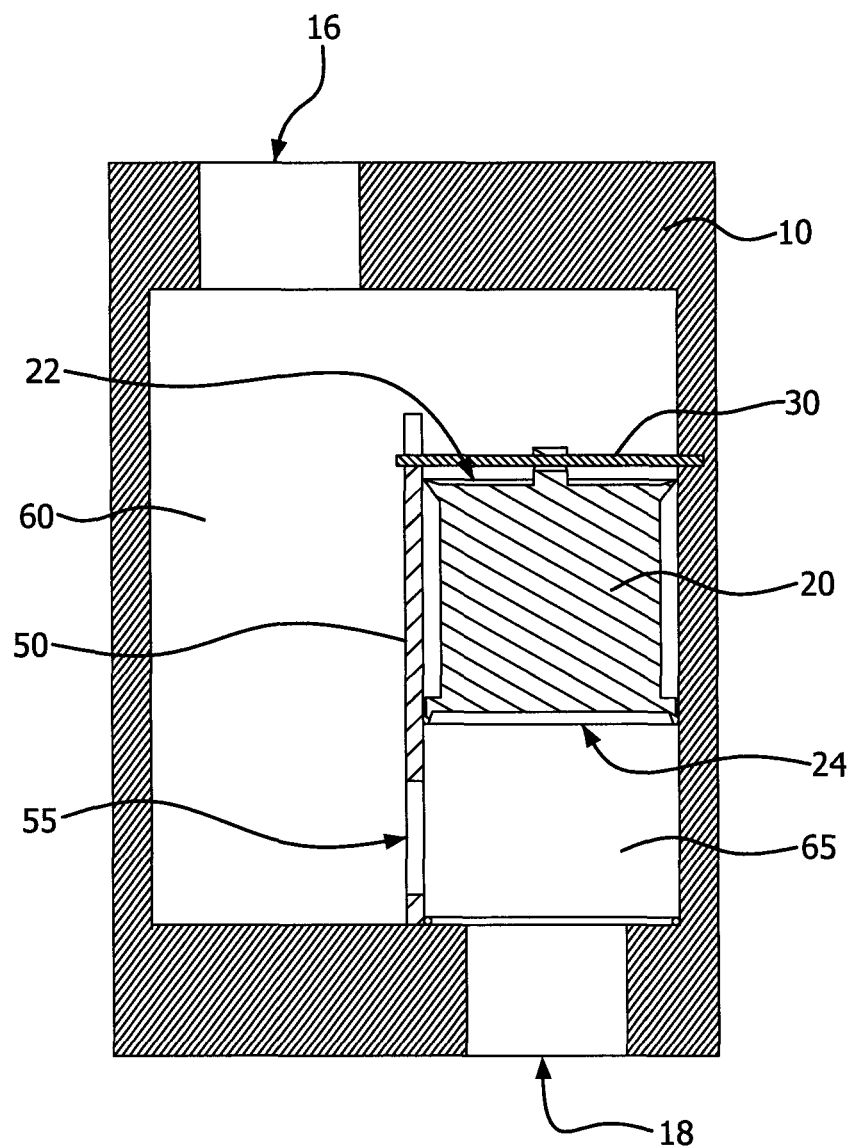
FIG. 5 illustrates a cross-sectional view through an excess flow shutoff valve with a valve plug mounted asymmetrically in the valve body.

The valve plug 20 may be ring-shaped and disposed within an annular space between the partition 50 and the valve body 10 as shown in FIG. 4. The valve plug may be asymmetrically disposed in the second chamber 65 as shown in FIG. 5. In these cases, the first chamber 60 may be defined by the inlet port 16, a portion 10a of an inner surface of the valve body 10, a first (inner) surface 50a of the partition 50, and the upstream end 22 of the valve plug 20 when the valve plug 20 is in the position that permits fluid to flow from the inlet port 16 to the outlet port 18. The second chamber 65 may be defined by at least the outlet port 18, a second (outer) surface 50b of the partition 50, a second portion 10b of the inner surface of the valve body 10, and the upstream end 22 of the valve plug 20 when the valve plug 20 is in the position that permits fluid to flow from the inlet port 16 to the outlet port 18.

Figure 6:
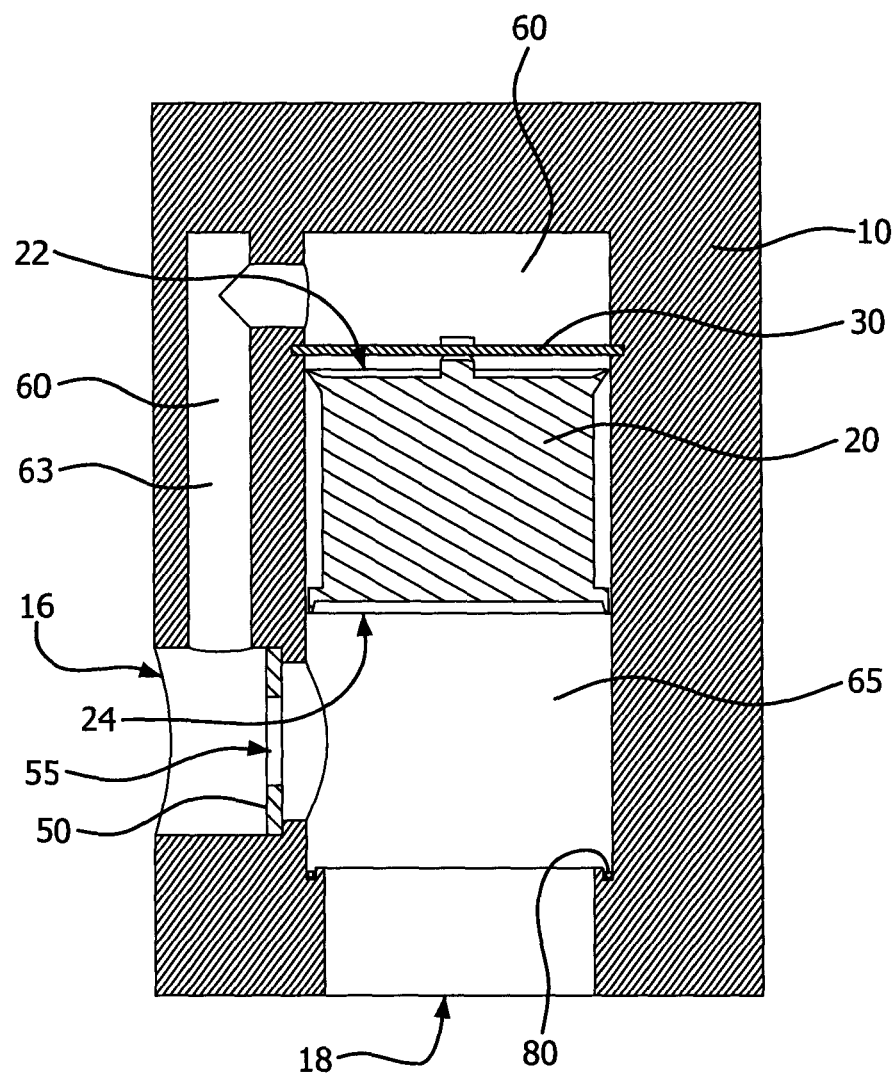
FIG. 6 illustrates a cross-sectional view through an excess flow shutoff valve where the valve body defines an internal flow passage.

FIG. 6 illustrates an alternative embodiment where the valve plug is disposed within the valve body and the partition is disposed downstream of the downstream end of the valve plug. The valve body defines an internal passage 63 and the first chamber 60 comprises the internal passage 63.

The partition 50, and depending on the geometry, also the valve body, may guide the valve plug 20 from the position that permits fluid to flow from the inlet port 16 to the outlet port 18, as shown in FIG. 1, to the position that blocks fluid from flowing from the inlet port 16 to the outlet port 18, as shown in FIG. 2. The partition 50 is operatively disposed to shield the valve plug 20 from a greater portion of the fluid flow that might otherwise induce a force on the valve plug 20 and cause the valve plug 20 to vibrate undesirably. There may, however, be some unbalanced and unsteady flow induced forces caused by a smaller portion fluid flow (a bypass flow of fluid) that passes through a gap between the valve plug 20 and the partition 50.

The partition 50 may be suitably shaped to deflect fluid that enters through the inlet port 16 of the valve body 10 away from the upstream end 22 of the valve plug 20.

The first chamber 60 provides a flow passage for fluid to flow from the inlet port to the outlet port. The geometry of the valve body 10, the valve plug 20, and the partition 50 are such that a greater portion (i.e. more than 75% or more than 95%) of the fluid passes through the first chamber as the fluid moves from the inlet port 16 to the outlet port 18 of the valve body 10.

A space 52 in the first chamber 60 that is adjacent the upstream end 22 of the valve plug is in fluid flow communication with the main flow passage provided by the first chamber 60 so that a pressure differential can be established between the upstream end 22 of the valve plug 20 and the downstream end 24 of the valve plug 20 when the valve is in the position that permits fluid to flow from the inlet port to the outlet port as shown in FIG. 1. This fluid flow communication may be established via gap 70. A small portion of the fluid flow (a bypass flow of fluid), for example less than 5%, may pass through gap 70, flow down between the valve plug 20 and the partition 50, and rejoin the fluid that flowed through the first chamber 60. The bypass flow of fluid defines the upstream end 22 of the valve plug 20 and the downstream end 24 of the valve plug 20, the bypass flow passing from the upstream end 22 to the downstream end 24 of the valve plug 20.

The dimensions and tolerances of the valve plug and the partition are such that the gap between the valve plug and the partition is large enough to prevent seizing of the valve plug to the partition due to oxidation, thermal expansion, and the like. The valve plug 20 must be able to move freely.

Figure 7:
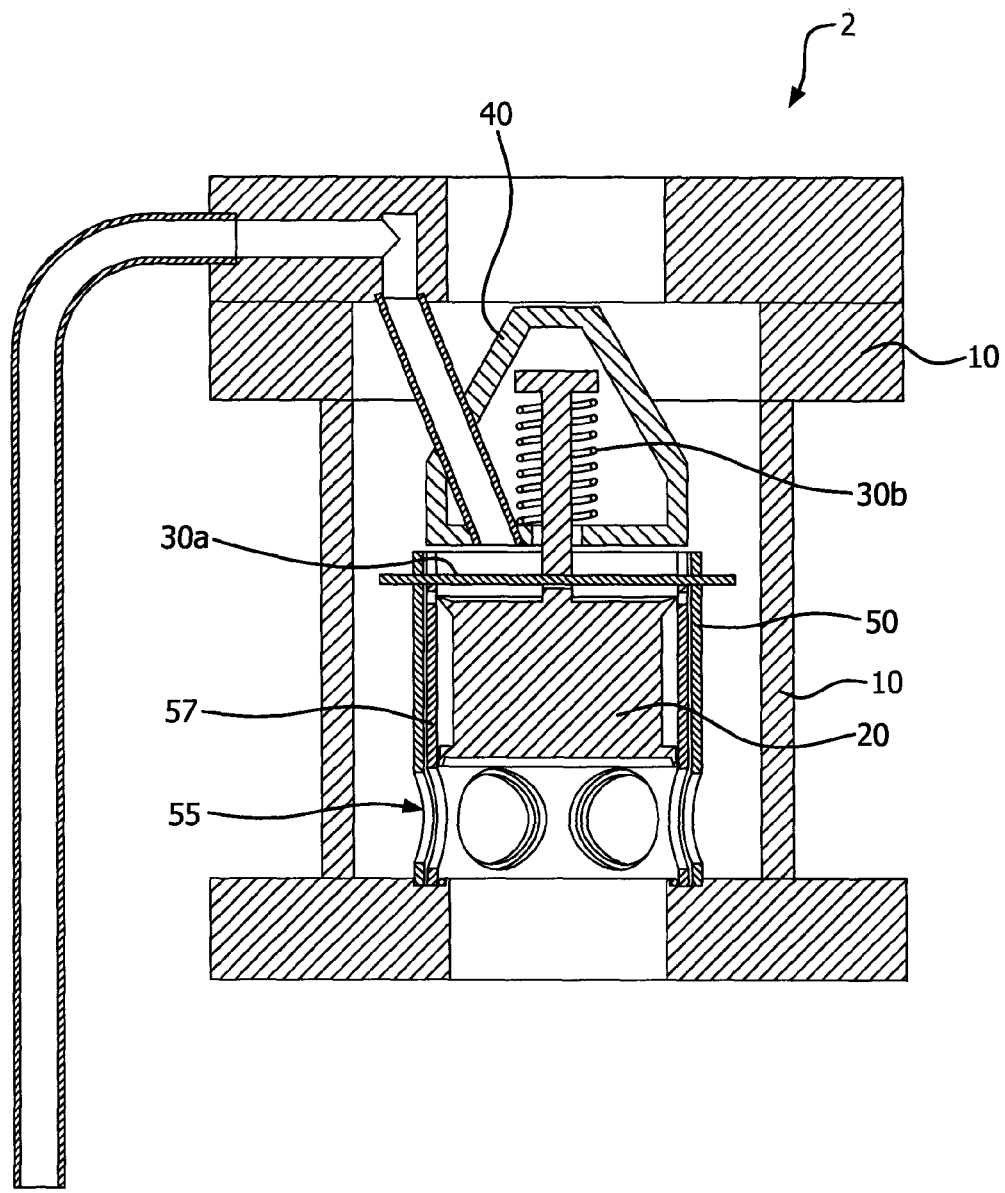
FIG. 7 illustrates a cross-sectional view through an excess flow shutoff valve with an inner sleeve, and an activation component comprising a pin and a deformable link.

As shown in FIG. 7, the partition 50 may comprise an optional ceramic lining 57 covering at least a portion of the partition 50. The ceramic lining 57 may be provided to prevent seizing of the valve plug 20 to the partition 50 due to oxidation of either component. In case the valve plug and ceramic lining are both fabricated of ceramic, a tighter fit between the valve plug and the partition may be permissible, which may have some advantages as discussed below.

The partition 50 may be a sleeve-like member. The partition 50 may be a hollow cylindrical member. The cross section of the partition may be circular or non-circular, for example, oval, square, rectangular, etc. The cross-section of the partition may vary along its length. For example, the partition may in particular be constant in cross-section along its entire length or the length which is in contact with the valve plug, or the partition may be tapered as in an inverted truncated cone. The valve plug has a shape that is complementary to the partition.

The partition 50, in addition to guiding the valve plug 20 from the position that permits fluid to flow from the inlet port to the outlet port to the position that prevents fluid from flowing from the inlet port to the outlet port, provides the technical effect of directing most of the fluid flow away from the valve plug and thereby effectively shields the valve plug from most of the flow and greatly reduces any flow induced movement or vibrations of the valve plug that otherwise would be caused by the fluid flow. Flow induced movement of the valve plug may cause a premature trip or activation of the activation component.

The partition 50 may be constructed from the same material as the valve body 10, but it is not required that the partition 50 be constructed of the same material as the valve body 10. Since the valve plug 20 must move freely, oxidation resistance should be considered when selecting a material for the partition. If the valve plug also touches the valve body as in the geometries for FIG. 4 and FIG. 5, oxidation resistance should be considered when selecting the material for the valve body. Excessive oxidation can lead to binding or seizing of the valve plug to the partition and/or valve body.

The excess flow shutoff valve comprises an activation component 30 disposed within the valve body 10 and operatively connected to the valve plug 20 to hold the valve plug 20 in place within the valve body 10 in the position that permits fluid to flow from the inlet port 16 to the outlet port 18 as shown in FIG. 1. The activation component may be directly or indirectly connected to the valve plug. Since the article "an" means one or more when applied to any feature, the excess flow shutoff valve may comprise one or more activation components.

For purposes of the present disclosure, the term "activation component" refers to any device configured to maintain the valve plug in a first configuration until a predetermined differential pressure force is exerted on the valve plug and/or until a predetermined temperature is experienced whereupon the particular device will allow the valve plug to move to a second configuration. By way of non-limiting examples, activation components include force sensitive elements such as pins in bending, buckling pins, shear pins, tensile pins, deformable links, and other equivalent structures. A pin is any elongated structure capable of acting as an activation component. The deformable link may be in the shape of a spring (such as a coil or Belleville), but, when activated, it permanently deforms due to creep. Belleville springs, named for inventor Julian F. Belleville, are also known as coned-disc springs, conical spring washers, disc springs, Belleville springs, and cupped spring washers. It is also contemplated that the activation component may include a temperature sensitive element such as fusible alloys and other equivalent structures such that the activation component allows the valve plug to move to the second configuration above a predetermined temperature but at normal operating flows.

Each of the valve plug 20, the partition 50, and the activation component 30 are disposed within the valve body 10, providing the advantage that no seals in the valve body are required to operatively connect the various components. This can be particularly important for high temperature applications.

The load on the activation component includes a pressure load created by the pressure drop through a flow restriction and in the case of a vertically oriented valve plug, the plug weight.

FIG. 7 shows a cross-sectional view through an excess flow shutoff valve 2 where the activation component comprises both a pin in bending 30a and a deformable link 30b (in the form of a spring). While shown with both a deformable link and a pin, the excess flow shutoff valve may include a deformable link by itself, a pin without the deformable link, or the combination of both the deformable link and pin.

If the activation component is a deformable link or comprises a deformable link, the deformable link may have a creep characteristic such that the deformable link creeps sufficiently slowly when the pressure difference is less than the target pressure difference occurring between the upstream end 22 of the valve plug 20 and the downstream end 24 of the valve plug 20 thereby holding the valve plug 20 in the position that allows fluid to flow from the inlet port 16 to the outlet port 18 for a first target time period when the pressure difference is less than the target pressure difference. The deformable link is deemed to creep "sufficiently slowly" if the deformable link maintains the valve plug in the position that allows fluid to flow from the inlet port to the outlet port for the first target time period. The creep characteristic may also be such that the deformable link creeps sufficiently quickly upon the pressure difference exceeding the target pressure difference occurring between the upstream end 22 of the valve plug 20 and the downstream end 24 of the valve plug 20. Upon the deformable link creeping, the valve plug 20 is caused to move to the position that blocks fluid from flowing from the inlet port 16 to the outlet port 18 within a second target time period. The deformable link is deemed to creep "sufficiently quickly" if the deformable link causes the valve plug to move to the position that blocks fluid from flowing from the inlet port to the outlet port within the second target time period.

The deformable link may be designed to creep slowly or quickly, as desired. The first target time period may be from a few months to several decades, or any time period desired. The second target time period may be from a few seconds to a few weeks, or any time period desired.

The deformable link may be any suitable oxidation-resistant material having suitable creep characteristics. The deformable link material may be, for example, Haynes® 230, Haynes® 25, and Inconel® 617.

Springs are not typically used at elevated temperatures because the material properties of the metals become time-dependent; that is, the spring will creep over time, permitting the valve to close during normal operation. For the present excess flow shutoff valve, the deformable link, if present, may be in the shape of a spring to allow large movements as it deforms. The deformable link may be designed with a very low stress during normal operation, such that the creep rate of the metal is very slow and the valve will not close over the design life of the excess flow shutoff valve under normal operation. Because the creep rate of many alloys is strongly dependent on stress (typically proportional to $\sigma^n$, where $\sigma$ is the applied stress and n is between 5 and 10), increasing the load by a factor of 2 or more will dramatically increase the creep rate and allow the valve to close quickly. If the load were to increase by only a small amount, however, the valve would close slowly. In certain applications, slow closure can be beneficial.

If the activation component is a pin or comprises a pin, the pin may have a strength such that the pin will break only upon the pressure difference exceeding the target pressure difference occurring between the upstream end 22 of the valve plug 20 and the downstream end 24 of the valve plug 20. Upon the pin breaking, the valve plug 20 is caused to move to the position that blocks fluid from flowing from the inlet port 16 to the outlet port 18.

The pin 30a may be supported by the partition 50 when the pin holds the valve plug 20 in place within the valve body 10 in the position that permits fluid to flow from the inlet port to the outlet port. Alternatively, the pin may be supported by the valve body 10 or any other suitable support within the valve body.

Figure 8:
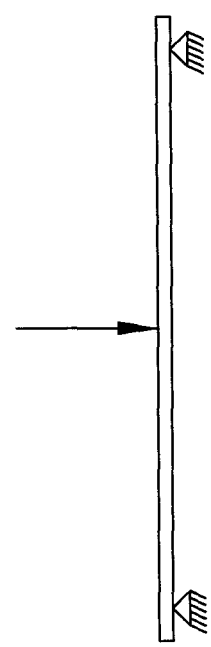
FIG. 8 illustrates a pin in 3 point bending.
Figure 9:
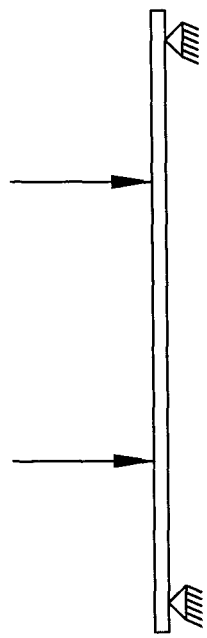
FIG. 9 illustrates a pin in 4 point bending.
Figure 10:
FIG. 10 illustrates a pin in tension.

The pin may be loaded in a three-point bending mode, a four-point bending mode, or an n-point bending mode with n>4, or it may be loaded in tension, or other suitable mode, where the pin will break at a specified load. FIG. 8 shows a pin in 3 point bending, where the arrow indicates the load point. FIG. 9 shows a pin in 4 point bending, where the arrows indicate the load points. FIG. 10 shows a pin in tension.

The pin may be made from a stiff and brittle material, e.g. ceramic, that has suitable strength at elevated temperature. The strength of the pin should be consistent from pin to pin and time-independent. The pin should not oxidize or otherwise degrade in the operating environment. The pin material should be harder than the plug material, such that it does not wear if the valve plug experiences flow-induced vibration or movement. Any wear on the pin may reduce the load at which it will break. The pin should be fatigue resistant. If there is vibration, the vibration may impose a high frequency cyclic load on the pin. For these reasons, a ceramic material with a high Weibull modulus may be chosen (the Weibull modulus being a measure of ceramic reliability—a material with a high Weibull modulus will break more reliably at a consistent load). Alumina may be a preferred material for oxygen production by ion transport membrane technology, although other ceramics or glasses could be used.

The probability of failure of a pin is derived from the form $$P_f = 1 - \exp\left(\frac{-\int_V \sigma^m dV}{V\sigma_0^m}\right),$$

where $\sigma_0$ is the characteristic strength of the material, m is the Weibull modulus, V is the volume of the pin under tensile loading, and $\sigma$ is the distribution of stress throughout the volume of the pin. The stress distribution is calculated from beam theory for the given loading condition.

Pin designs can be screened by targeting a low probability of breaking at the normal operating condition (e.g., 1 in 10,000 premature trips) and a high probability of breaking at the desired trip point (e.g., 95% trip rate). This can be achieved by selecting the material to get a suitable characteristic strength and Weibull modulus, selecting the length and diameter of the pin, adding features to the pin, such as a notch, and/or selecting the loading configuration on the pin (3-point bending, 4-point bending, or tension).

Changing to a material with a higher Weibull modulus, changing from three-point bending to four-point bending or to tensile loading, and adding a controlled notch to the pin are methods by which it may be possible to improve a pin's reliability (i.e., cause it to break over a narrower range of loads). By increasing the reliability of the pin, the possibility of spurious trips is reduced. Therefore, the ratio of trip flow rate to operating flow rate can be reduced.

Figure 11:
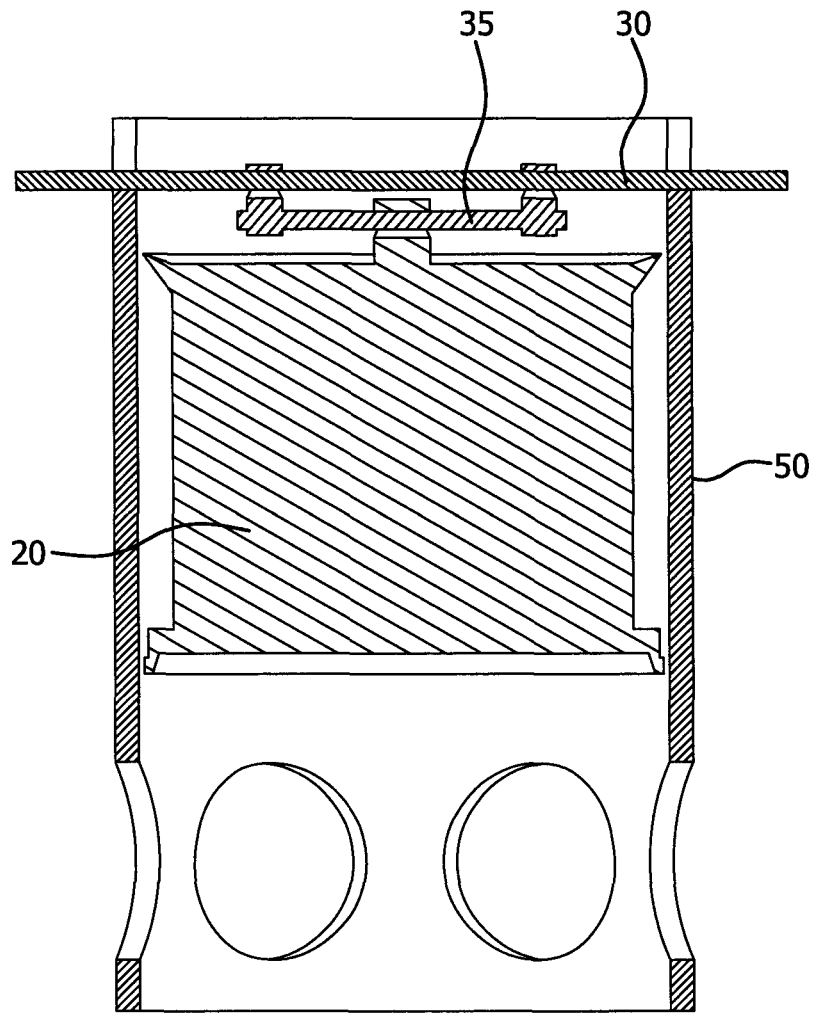
FIG. 11 illustrates a pin in 4 point bending with a spreader beam.

If the pin is configured in four-point bending, with the plug supported directly on the pin at two points, the plug will likely sit askew in the second chamber. The angle of the plug will be dictated by manufacturing tolerances in the plug and partition and/or valve body and whether the valve is precisely vertical. This lack of alignment promotes binding and vibration, potentially in the form of rocking from one support point to the other. These problems can be overcome by the addition of a spreader e.g. a spreader plate or spreader triangle or a spreader beam 35, as shown in FIG. 11. The spreader allows the valve plug 20 to hang loosely within the partition 50. The excess flow shutoff valve may comprise a spreader beam 35 or other type of spreader mechanically connecting the valve plug 20 to the pin 30 thereby putting the pin in an n-point bending configuration with n≥4, FIG. 11 showing the pin 30 in 4-point bending.

Changing the configuration of the pin to put it under tension will drastically decrease the maximum stress in the pin and therefore require a very small pin, which may be too delicate and not practical to handle. The small size also requires extremely tight tolerances on the diameter. Hence, a pin in tension may be less preferred than a pin in bending for some applications.

Notched pins require very precise machining operations to ensure the proper notch geometry. This may increase the cost and, if the machining is not sufficiently precise, may reduce reliability.

Pins in three-point bending or four-point bending may be preferred in some applications. Since a pin in four-point bending will break over a narrower range than a pin in three-point bending, it allows for a lower trip ratio between the trip flow rate and the normal operating flow rate. If a higher trip ratio is acceptable, three-point bending allows for larger, more robust pins and does not require a spreader, e.g. a spreader beam.

The activation component may include a pin 30a and a deformable link 30b (in the shape of a coil spring) in combination as shown in FIG. 7. In such embodiments, the pin has a strength such that the pin will break only upon the pressure difference exceeding the target pressure difference occurring between the upstream end 22 of the valve plug 20 and the downstream end 24 of the valve plug 20. The deformable link has a creep characteristic such that the deformable link will creep when the pressure difference exceeds a second target pressure difference occurring between the upstream end 22 of the valve plug and the downstream end 24 of the valve plug 20. The second target pressure difference may be less than the target pressure difference for the pin, the same as the pin, or greater than the pin. The deformable link may be capable of creeping at a pressure difference less than the target pressure difference since the pin will hold the valve plug in place up to the target pressure difference; nevertheless, the deformable link has a creep characteristic such that the deformable link will creep when the pressure difference exceeds the desired second target pressure difference. The pin and the deformable link are operatively disposed such that the pin initially holds the valve plug in place within the valve body 10 in the position that permits fluid to flow from the inlet port 16 to the outlet port 18, with little or no force on the deformable link. Upon the pin breaking, the valve plug is restrained by the deformable link. Therefore, the force to restrain the plug is applied to the deformable link after the pin breaks. In response to this force, the deformable link creeps, and the valve plug 20 is caused to move to the position that blocks fluid from flowing from the inlet port 16 to the outlet port 18 within a target time period.

This two-stage activation arrangement can be used to increase the range over which the excess flow shutoff valve closes slowly. For oxygen production using ion transport membrane systems, slow closure has the benefit of reducing mechanical stresses in the ion transport membrane module that would result from a sudden closure.

The excess flow shutoff valve requires a suitable flow restriction to create a pressure difference between the upstream end 22 of the valve plug 20 and the downstream end 24 of the valve plug 20 when fluid flows through the valve body 10. At least one of the valve body (as shown in FIG. 3) and the partition (as shown in FIG. 1) define one or more orifices 55 for fluid flow from the first chamber 60 to the second chamber 65 when the valve plug 20 is in the position that permits fluid to flow from the inlet port 16 to the outlet port 18. The one or more orifices 55 are at a position downstream of the downstream end 24 of the valve plug 20 when the valve plug is in the position that permits fluid to flow from the inlet port to the outlet port. The orifices may have a circular cross section, slot cross section, or any other suitable cross section. The one or more orifices 55 are designed such that the pressure difference is less than a target pressure difference when the fluid flows through the valve body 10 at a normal operating condition flow rate, which is less than a target or critical flow rate, and the pressure difference exceeds the target pressure difference when the fluid flows through the valve body at a higher rate, which is greater than the target or critical flow rate. (As used herein, "critical flow rate" does not refer to sonic or choked flow conditions, but rather critical in the sense of being an important juncture or event.)

The flow restriction may be sized to provide a pressure difference sufficient to trigger the activation component (e.g. greater than 6900 Pa) when the flow rate through the flow restriction exceeds the target or critical flow rate. The flow restriction may be sized to provide two or more times the pressure difference when the flow rate through the flow restriction exceeds the target or critical flow rate as compared to normal operation.

The one or more orifices 55 for creating the pressure difference may be one or more orifices 55 in partition 50 as shown in FIG. 1. The partition may define one or more orifices 55, wherein the orifices 55 are positioned downstream of the valve plug 20 when the valve plug is in the position that permits fluid to flow from the inlet port 16 to the outlet port 18. The one or more orifices provide a suitable flow restriction to create the pressure difference between the upstream end of the valve plug and the downstream end of the valve plug when fluid flows through the valve body.

The pressure difference between the upstream end of the valve plug and the downstream end of the valve plug as a function of flow characteristics of the valve may be controlled by altering the size, number, and shape of the orifices. In this manner, the valve can be designed for a wide range of process fluids, operating conditions, and trip points.

The pressure drop versus flow characteristics of a given orifice configuration can be determined empirically by conducting flow tests with air at ambient temperature and pressure, and then scaling the results to operating conditions using standard Reynolds number matching methods. Tests may be performed on several full-sized valve components with the test conditions set such that the Reynolds number during tests matches the Reynolds number during normal operating and trip conditions. The test data may then be fit to the form $$\Delta P = \frac{K \rho V^2}{2},$$

based on the functional form of the Engineering Bernoulli equation, where $K$ is the experimental variable to be determined, $\Delta P$ is the measured pressure drop, $\rho$ is the density of the fluid, and $V$ is the velocity of the fluid.

The velocity through the one or more orifices may advantageously be much greater than the velocity through the first chamber 60 and/or the velocity through the valve outlet port 18. This keeps the total pressure drop through the valve at a minimum. It may be preferred that the ratio of the orifice area to the first chamber area and the ratio of the orifice area to the outlet port area are both less than 0.50.

Alternatively, the flow restriction for creating the pressure difference may be a suitably sized first chamber 60. The flow restriction for creating the pressure difference may be a washer-like plate positioned in the first chamber 60 where the washer-like plate has one or more orifices. The one or more orifices may be formed in a lining of the partition or a sleeve around the partition.

Figure 12:
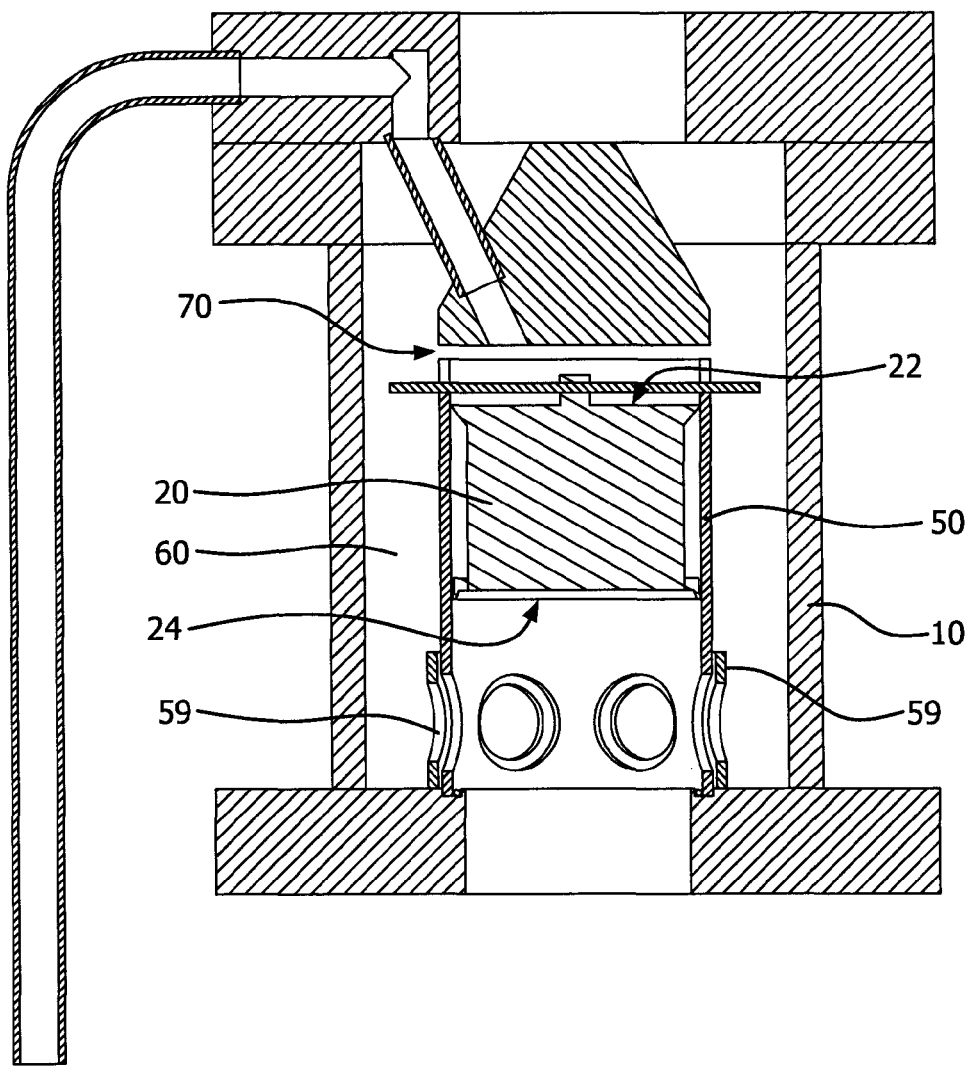
FIG. 12 illustrates a cross-sectional view through an excess flow shutoff valve with an outer sleeve.

The partition may comprise a sleeve 59 as shown in FIG. 12. The one or more orifices may be formed in the sleeve. The sleeve 59 may have one or more orifices thereby providing the suitable flow restriction to create the pressure difference between the upstream end 22 of the valve plug 20 and the downstream end 24 of the valve plug 20 when fluid flows through the valve body 10.

The excess flow shutoff valve may be designed so that various sleeves having different size and/or number of orifices may be interchanged to vary the pressure drop as a function of flow rate. In case a greater pressure drop is desired, a sleeve having smaller and/or fewer orifices may be exchanged into the valve body. Use of a sleeve may provide a low cost way to customize the valve for different applications.

The flow restriction should be created without requiring fluid to flow through any orifices in the valve plug. The advantage of not including orifices in the valve plug 20 for providing the flow restriction for pressure drop is so that the valve plug can be isolated from bulk flow of fluid thereby reducing any flow-induced movement or vibrations of the valve plug.

The excess flow shutoff valve 1 may further comprise a flow deflector 40 disposed within the valve body 10 as shown in FIGS. 1, 2, 7, 12, 13, 16 and 17. The flow deflector 40, if present, is positioned between the inlet port 16 of the valve body 10 and the upstream end 22 of the valve plug 20 for deflecting fluid that enters through the inlet port 16 of the valve body 10 away from the upstream end 22 of the valve plug 20. In addition to shielding the upstream end of the valve plug, the flow deflector may advantageously shield the activation component 30. The flow deflector 40 may be mounted to the valve body. The flow deflector 40 and the partition 50 form a gap 70 therebetween.

In another embodiment, the flow deflector may be integrated with the partition. A small opening or gap in the partition near the top of the valve plug 20 may be included to allow fluid flow communication between the space 52 and the portion of the first chamber 60 where the greater portion of the fluid flows through the valve.

The gap 70 between the flow deflector 40 and the partition 50 allows the pressure in the space directly over the upstream end of the valve plug 20 to be about the same as the pressure in the first chamber 60 in the valve body where the greater portion of the fluid flows through the valve. There is typically little flow through this gap 70 and therefore little pressure drop through the gap 70.

The flow deflector 40 directs the fluid away from the upstream end of the valve plug. The flow deflector protects the top of the valve plug from the direct impact of the incoming fluid flow, which could cause vibration of the valve plug and potentially lead to premature failure of the activation component. The shape of the flow deflector may be selected to diminish the amount of pressure drop associated with diverting the fluid flow away from the valve plug. As shown in FIG. 1, a conically-shaped flow deflector may be used. The flow deflector may be made from the same material as the valve body.

The valve body may be sized such that the velocity around the flow deflector and partition is low relative to the velocity through the flow restriction, thereby keeping the overall pressure drop through the shutoff valve low and within tight specifications.

As shown in FIGS. 1-2, the excess flow shutoff valve may further comprise a gasket 80 positioned to form a seal between the valve plug and at least one of the valve body and the partition when the valve plug is in the position that prevents fluid from flowing from the inlet port to the outlet port. The gasket 80 may be supported by the valve body 10 near the outlet end of the valve body 10. The gasket 80 is positioned to form a seal between the valve plug 20 and the valve body 10 when the valve plug 20 is in the position that prevents fluid from flowing from the inlet port 16 to the outlet port 18 as shown in FIG. 2.

The gasket may be an o-ring. Gaskets having other cross-sections may also be suitable. The gasket may seal with an axial face or a circumferential surface or both in combination.

The gasket may be formed from any suitably compliant or malleable material at operating conditions, compatible with the process fluids.

The gasket may be positioned within the partition 50.

After the valve plug moves to the position that blocks fluid from flowing from the inlet port 16 to the outlet port 18, the pressure differential acting on the valve plug increases to the full operating pressure, which puts a large force on the plug and helps create a seal against the gasket.

As shown in FIG. 1, the gasket 80 may be situated in a groove in the valve body and is configured to be contacted by a suitably-shaped perimeter of the downstream end of the valve plug 20. The groove keeps the gasket in place and shelters the gasket from the fluid flow during normal operation. The downstream end of the valve plug 20 may have a suitably-shaped perimeter that concentrates contact stress and deforms the gasket 80 when the valve plug moves to the position that prevents fluid from flowing from the inlet port 16 to the outlet port 18. The perimeter of the downstream end of the valve plug may be, for example, wedge-shaped.

In an alternative configuration (not shown), the gasket may be attached to the lower side of the perimeter of the valve plug.

For high operating temperatures, soft metals may be the preferred material for the gasket. For lower operating temperatures, other materials may be suitable.

Gold is a suitable material for use at 700-950° C. in air or oxygen service, because it is dense and will not be affected by high velocity fluid, it is non-reactive with the oxygen-containing environment, and it is soft and conforms well in this temperature range allowing it to fill imperfections in the surfaces and create a tight seal. Tests using gold o-rings have proven that gold o-rings quickly create a tight seal with undetectable leak rates.

Non-metal gasket materials that are suitable for high temperatures, such as mica and Thermiculite® 866, may not be suitable as the gasket in a groove at the outlet end of the valve body, because they may be damaged or blown downstream by high velocity fluid flow. These materials are also quite fragile, which makes them difficult to handle.

Figure 13:
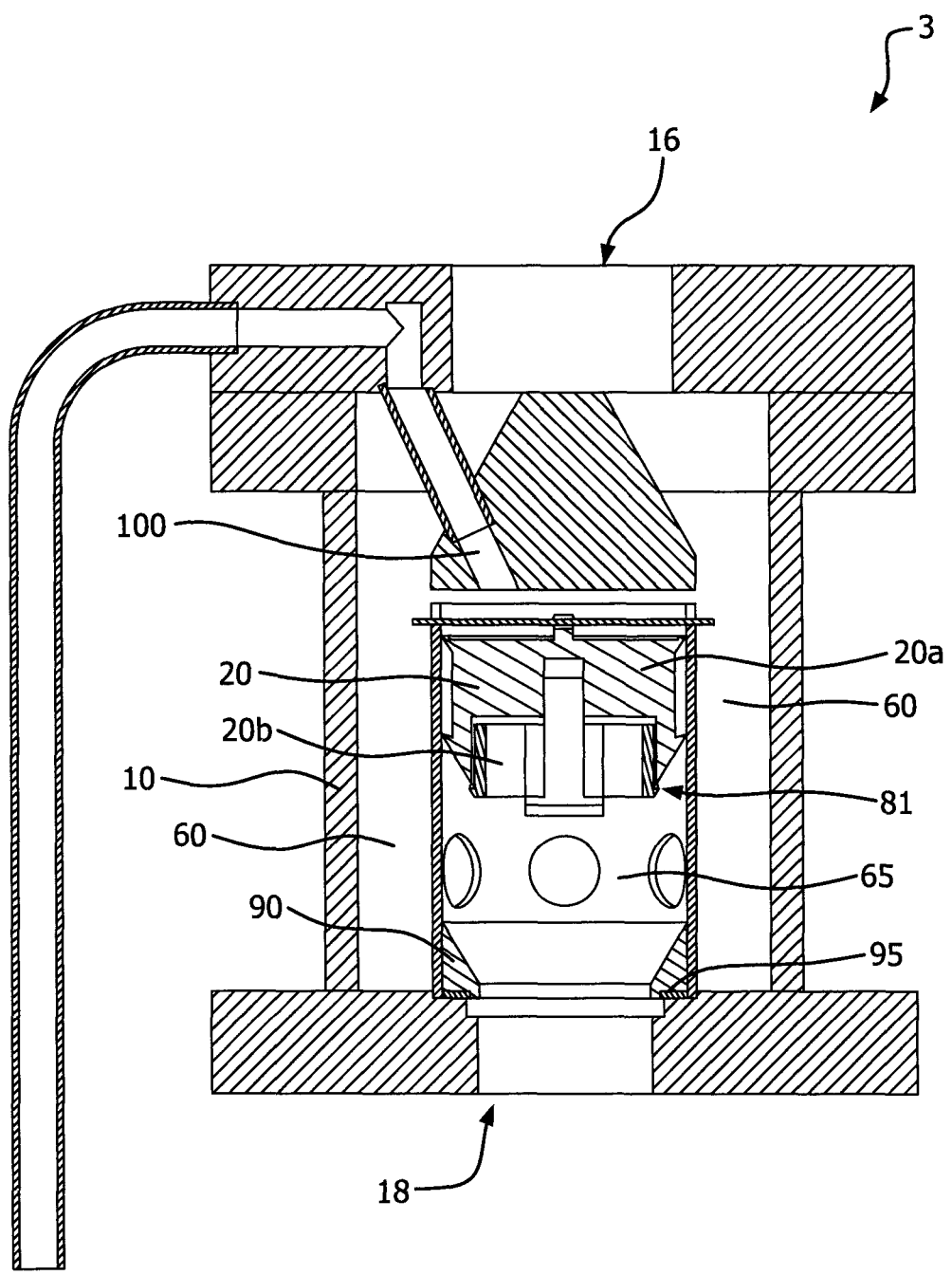
FIG. 13 illustrates a cross-sectional view through an excess flow shutoff valve with a removable seat.

In yet another alternative configuration, gasket 81 may be positioned in a groove in the valve plug 20 as shown in FIG. 13. The valve plug may comprise an upper part 20a and a lower part 20b with the gasket 81 positioned at a junction therebetween.

In the embodiment shown in FIG. 13, the excess flow shutoff valve 3 comprises a removable valve seat 90 and a second gasket 95 proximate the outlet end of the valve body 10. The valve seat 90 is positioned to form a seal with the gasket 81 when the valve plug 20 is in the position that prevents fluid from flowing from the inlet port 16 to the outlet port 18. The second gasket 95 is positioned between the valve seat 90 and the valve body 10 to provide a seal between the valve seat 90 and the valve body 10.

This alternative embodiment, as shown in FIG. 13, allows easier re-use of the valve and eliminates the gasket groove in the valve body and therefore removes any risk of debris collecting in the gasket groove.

When the valve plug moves to the position that prevents flow through the valve, the gasket 81 will contact the removable seat 90 and the two-part valve plug will collapse, deforming the gasket 81. The lower portion 20b of the plug may be vented to keep the intermediate space at the downstream pressure and allow the plug to collapse. After activation of the excess flow shutoff valve, the valve plug 20 and seat 90 may be easily removed from the valve body to be reworked after removal of the excess flow shutoff valve from the system.

A Thermiculite® 866 gasket or other suitable material may be used for gasket 95 below the seat 90, because this material will not bond to the metal of the surrounding surfaces. In this embodiment, gasket 95 is shielded from the flow, and therefore, damage or blowing of the gasket 95 should not be a concern.

The excess flow shutoff valve may further comprise an activating fluid injection passage 100 for injecting an activating fluid at the upstream end 22 of the valve plug 20. The activating fluid injection passage 100 may pass through the flow deflector 40 as shown in FIG. 1. The activating fluid injection passage may be connected to a separate fluid source that is at a higher pressure than the excess flow valve operating pressure.

The valve plug 20, the flow deflector 40, and the partition 50 may form a space 52 disposed for receiving the activating fluid from the activating fluid injection passage 100. The partition and the flow deflector form a flow-restricting gap 70 between the partition 50 and the flow deflector 40 which is disposed to restrict the flow of the activating fluid out of the space 52. Fluid may leave the space 52 through the flow-restricting gap 70 and through the gap between the valve plug and the partition. The flow-restricting gap is sized to cause a pressure increase inside the space that exerts a force on the top of the valve plug and causes the activation component to activate (the pin to break, the deformable link to creep, etc).

It is therefore possible to trip the excess flow shutoff valve remotely by introducing a burst of activating fluid into the space between the top of the plug and the underside of the flow deflector 40. The flow restriction created by the gap between the flow deflector and the partition allows pressure to build in this space with a small amount of flow. Much less flow is required compared to the amount of flow that would be required to trip the valve if the flow was introduced directly into the valve body through the inlet port 16. This is especially beneficial for high temperature gas applications because it makes it practical to trip the valve with ambient temperature fluid, which is much denser than the typical high temperature operating fluids in the valve during operation.

The activating fluid injection passage 100 may also be used for withdrawing fluid samples from the valve.

The excess flow shutoff valve works in the following way. With reference to FIG. 1, showing the valve in a vertical orientation, the valve plug 20 hangs freely on the activation component 30 within the partition 50. The flow deflector 40 and valve plug 20 block the top of the partition 50, forcing the majority of the gas to flow around the valve plug through a passage in the first chamber 60 and through the downstream flow restriction (orifices 55). The flow through the flow restriction causes a pressure differential between the upstream end 22 of the valve plug 20 and the downstream end 24 of the valve plug 20 causing a net force on the valve plug 20. When the target or critical pressure drop is reached, the force exerted on the activation component 30 is sufficient to activate the activation component (the pin breaks, the deformable link creeps, etc.), and the valve plug 20 moves through the second chamber 65 onto gasket 80, and the valve plug blocks off the outlet port 18. When the outlet port is blocked, the pressure differential acting on the valve plug increases to the full operating pressure, which puts a large force on the plug and helps create a seal against the gasket.

Excessive flow around the valve plug within the second chamber (i.e. bypass flow) is undesirable, since bypass flow will affect the imposed differential pressure load on the valve plug and may also cause flow-induced vibration of the plug that could lead to a premature failure of the activation component. Furthermore, the adverse effects of bypass flow worsen as bypass flow increases. Therefore, it is desirable to minimize the gap between the valve plug 20 and the second chamber 65 wall in order to minimize bypass flow. Large bypass flows can affect the pressure load that is imposed on the valve plug because of the resistance to flow through the gap 70 between the partition and the flow deflector (i.e. the pressure in the space 52 above the valve plug may become significantly less than the pressure in flow passage of the first chamber 60). Bypass flow also increases uncertainty in the amount of flow that passes through the flow restriction, and thus, in the pressure difference between the upstream end of the valve plug and the downstream end of the valve plug.

The exact amount of bypass flow cannot be tightly controlled, as it is affected by the accumulation of many tolerances and how well the valve plug 20 is centered in the second chamber 65. At the same time, and particularly in high temperature applications, the valve plug cannot have a tight sliding fit, because it must not seize or bind during operation. Any out-of-roundness, any eccentric positioning of the valve plug within the second chamber, and/or any other misalignment of the valve plug within the second chamber will exacerbate seizing and binding.

There are competing issues at play. A balance must be struck in the design to minimize bypass flow and at the same time avoid binding or seizing.

Figure 14:
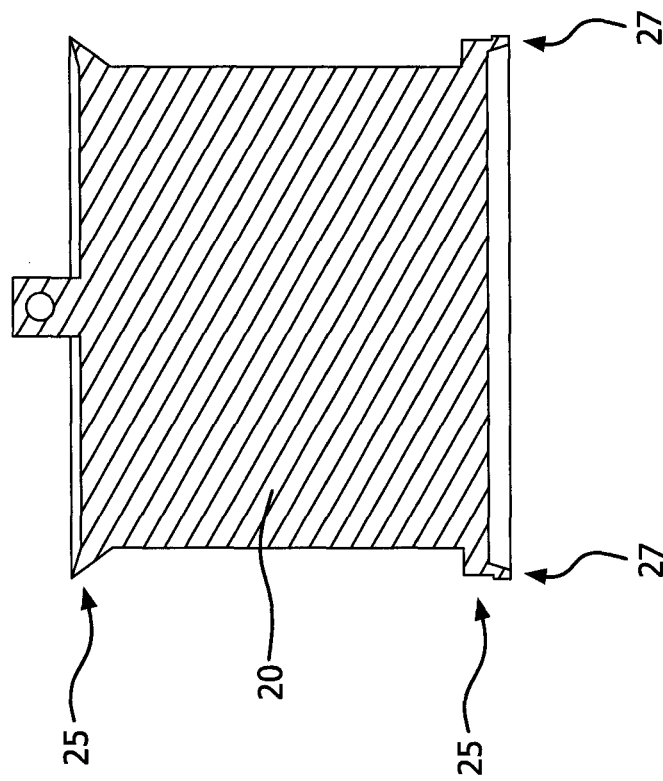
FIG. 14 illustrates a valve plug with 2 circumscribing ribs.

The addition of one or more circumscribing ribs along the length of the valve plug can be helpful in striking this balance. The valve plug may have one or more circumscribing ribs 25 as shown in FIG. 14, where 2 circumscribing ribs are shown, and FIG. 15, where 4 circumscribing ribs are shown. The valve plug may have two or more circumscribing ribs. The valve plug may have three or more circumscribing ribs.

A valve plug with circumscribing ribs has one or more circumscribing protrusions that set the gap between the valve plug and the second chamber wall. Circumscribing ribs of a valve plug are ribs that go around the perimeter of the valve plug on the face defined between the upstream end of the valve plug and the downstream end of the valve plug. The remainder of the valve plug is cut down to a smaller diameter, such that the gap between the majority of the valve plug and the second chamber wall is greater than it is at the circumscribing ribs.

The technical effect of the one or more circumscribing ribs is to limit vibration of the valve plug and to generate natural flow-induced forces that hold the valve plug centered in the second chamber. The circumscribing ribs also help solve the problem of seizing of the valve plug to the partition and/or valve body by reducing potential contact area between the valve plug and the partition and/or valve body, as compared to a straight-walled plug (i.e. a valve plug without any circumscribing ribs).

Straight-walled valve plugs may be more prone to vibration that is caused by unbalanced and unsteady flow-induced forces which are generated when fluid (i.e. bypass flow) flows through the gap between the valve plug and the partition. The flow-induced forces push the valve plug from side to side causing it to vibrate within the second chamber. Ribbed valve plugs may help to eliminate vibration by introducing a large area for circumferential flow to allow pressure equalization around the full perimeter of the valve plug, thereby significantly reducing unbalanced forces, while still maintaining a small gap between the rib and the valve body to restrict bypass flow.

In addition to reducing vibration, the circumscribing ribs may help to prevent seizing of the plug by reducing the surface area that can contact the partition and/or valve body wall. By contrast, with a straight-walled valve plug, the unbalanced flow-induced forces may steadily push the valve plug against the wall of the partition and/or valve body and hold it there, thereby increasing the chance of seizing.

The circumscribing ribs may be shaped to catch any debris that may get into the second chamber, helping to prevent the valve plug from binding in the second chamber.

The one or more circumscribing ribs or one or more ribs of a plurality of circumscribing ribs may be tapered. The circumscribing ribs may be shaped to move any debris away from the second chamber walls and collect the debris, such that the debris does not become trapped between the valve plug and the second chamber walls. Ribs tapered upwards helps to prevent the valve plug from getting stuck in the second chamber due to debris being trapped between the valve plug and the partition and/or valve body. The respective rib or ribs may in particular be tapered at the side facing towards the second chamber.

Figure 15:
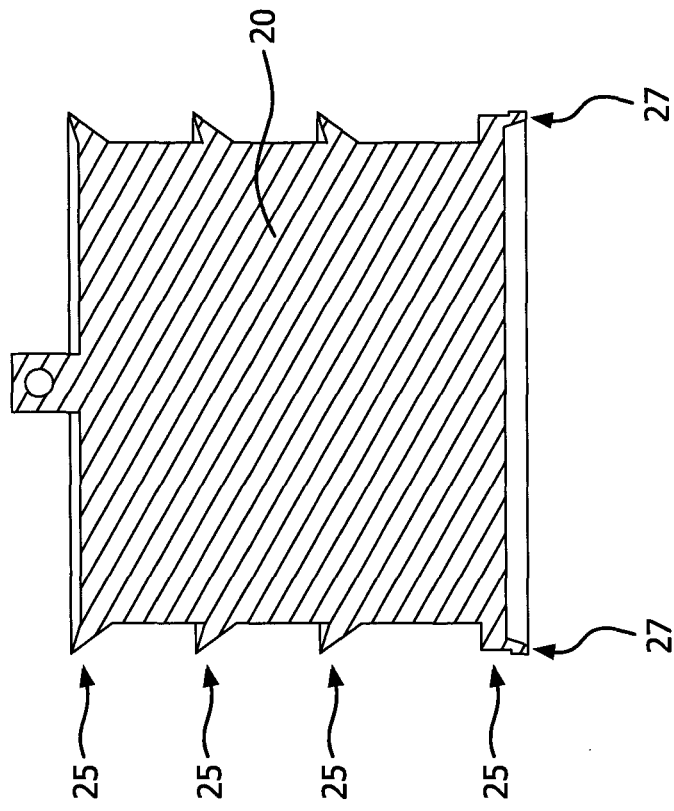
FIG. 15 illustrates a valve plug with 4 circumscribing ribs.

The addition of one or more intermediate circumscribing ribs, as in a three-ribbed plug or the four-ribbed plug in FIG. 15, helps to reduce bypass flow through the gap between the valve plug and the partition and/or valve body when compared to a valve plug with fewer ribs, by increasing the overall resistance to flow through the gap. Each time the fluid flows across a rib, it is forced to accelerate and then decelerate, and thereby experience pressure drop. As more ribs are added, the overall flow resistance through the gap increases, and the bypass flow decreases as a consequence. In some configurations, for the same radial gaps, the flow resistance with ribbed plugs is greater than that with straight-walled plugs. The radial gap and number of ribs will ideally be selected to keep the bypass flow below 5% of the total flow through the valve.

A ribbed valve plug, when compared to a straight-walled valve plug, has the desired benefits of being less prone to vibration, of being less prone to seizing to the wall of the partition and/or valve body, and in some configurations, of allowing less bypass for equal gap size.

Other suitable valve plug designs, such as tapered valve plugs or valve plugs with non-circular cross-section are possible and would be used with partitions and valve bodies having complementary shape.

If necessary, vibration can be further reduced by adding a dampening mechanism to the valve plug. For example, the plug can be hollowed out and filled with a granular material (such as sand) or a material that is liquid at operating conditions (such as a low melting point metal).

The valve plugs in FIGS. 14 and 15 are shown with a narrow knife-edge 27 on the bottom surface of the valve plug that contacts the gasket when the valve closes. The knife-edge may be about 0.4 mm (0.015") wide.

The weight of a valve plug may be changed without significantly altering the differential pressure force on the valve plug, primarily by making the plug hollow, but also by changing the material of construction such as from a metal to a ceramic material, or by changing the length of the plug. The weight of the valve plug may also be altered by decreasing the inside diameter of the ribs while keeping the outside diameter of the ribs constant. As noted in the discussion of the activation component, the valve plug weight is a component of the load applied to the activation component when the valve is in the vertical orientation. The operating and trip points can thus be adjusted by changing the weight of the valve plug. Reducing the valve plug weight also makes the valve more reliable by increasing the ratio of the trip load to the operating load.

The length of the valve plug should be sufficient to prevent binding in the second chamber. A longer valve plug is resistant to binding because the contact forces between the plug and the wall of the second chamber that are required to balance any applied moments decrease with length. Ideally, there is no moment applied to the plug. In practice, however, moments will be applied to the valve plug due to asymmetric pressure forces that result from manufacturing tolerances and flow instabilities, and due to external forces such as gravity.

The length-to-diameter ratio of the valve plug may be suitably selected to reduce the risk of binding. A suitable length to diameter ratio may be determined by testing. The length to diameter ratio may in particular range from 0.6 to 1.2. A length-to-diameter ratio of about 0.8 was found to work well. Longer valve plugs allow the addition of more circumscribing ribs to reduce bypass flow. Excessively long plugs affect the overall height of the device and may therefore be undesirable. In embodiments in which the valve plug is non-circular in cross-section, a hydraulic diameter, $D_H$, is used for determining the length-to-diameter ratio, where $$D_H = \frac{4 \times \text{cross-sectional area}}{\text{wetted perimeter}}.$$

In case the plug is tapered the largest diameter or largest hydraulic diameter is used.

The valve plug may be caused to move from the position that permits fluid to flow from the inlet port 16 to the outlet port 18 to the position that blocks fluid from flowing from the inlet port 16 to the outlet port 18 by gravitational force.

In alternative arrangements, the valve may be in a non-vertical (either angled or horizontal) arrangement. To move the valve plug in this arrangement, the differential pressure load on the plug needs to overcome friction that is caused when gravity pulls the valve plug against the side of the second chamber or the valve body. The coefficient of friction may be sensitive to materials of construction, operating temperature and time at temperature, and operating fluid. The introduction of friction, which is highly variable, would require an increase in the ratio of the trip flow rate to the operating flow rate in order to maintain reliable operation of the valve.

In a horizontal arrangement, the weight of the valve plug would not be held by the activation component and would not contribute to the activating load that is exerted on the activation component. In an angled arrangement, a fraction of the plug weight would be held by the activation component, the fraction dependent on the angle and the coefficient of friction between the valve plug and the partition and/or valve body.

In another alternative arrangement, the valve may be in an inverted vertical arrangement where the fluid flow direction is opposite the pull of gravity. In this arrangement, the differential pressure force must overcome the weight of the plug before the activation component can be activated. In an inverted vertical arrangement, the load on the activation component is equal to the differential pressure force minus the plug weight, as opposed to the standard vertical arrangement, wherein the load on the activation component is equal to the differential pressure force plus the weight of the valve plug; therefore, an inverted vertical valve will have a higher ratio of trip load to operating load on the activation component for a given design. In the inverted vertical arrangement, it is possible to use the weight of the plug as the activation component, if the plug is designed with a weight equal to the differential pressure force at the trip flow rate. In this case, the force required to activate the valve would be known with a great deal of accuracy and the valve could be designed with a lower ratio of trip flow rate to normal operating flow rate.

The present excess flow shutoff valve is a reliable design when operating with gases at high temperatures, such as required for producing oxygen or synthesis gas using ion transport membranes. Testing of a design that used a pin-in-bending as the activation component with air as the process fluid has demonstrated that the valve is very reliable. Because the working parts are sheltered from the gas flow by the partition and the flow deflector, the valve is reliable even in the presence of very high gas velocities, such as greater than about 150 m/s (500 feet per second). The valve has also been demonstrated to close reliably at the design point in tests with air at 700-950° C. The pin breaks at a consistent flow rate and the valve plug, which fits loosely in the second chamber, does not bind or seize, even when the process gas contains debris. Debris can be generated by high temperature processes (e.g. corrosion products from hot metal components or particles shed from insulation, etc.).

The present excess flow shutoff valve design can be modified easily to trip at different flow rates. This is accomplished by altering the force that is exerted on the activation component, and/or by altering the strength (i.e. the breaking or tripping point) of the activation component. The force on the activation component can be altered by changing the flow resistance that is caused by the orifices 55 in the partition and/or valve body, whereby the flow resistance can be changed by increasing or decreasing the open area of the orifices or by partially blocking the orifices, in order to change the differential pressure force that is exerted on the valve plug, by changing the cross-sectional area of the valve plug on which the differential pressure acts (e.g. by changing the valve plug diameter), and/or by changing the weight of the valve plug. If the activation component is a straight cylindrical pin, its strength can be changed by changing its diameter and/or its material of construction. If the activation component is a pin-in-bending, its effective strength can be changed by changing its span length and/or by changing its loading configuration. Examples of different loading configurations which would cause different mechanical stresses in the pin for a given load, and hence different breaking loads, include a cantilevered bending configuration, a three-point bending configuration and a four point bending configuration. To achieve even further adjustment in the effective strength of a pin-in-bending, the location along the span of the pin at which the load is applied can be changed, and in the case of a four-point-bend configuration, the distance between the load points can be changed. If the activation component is a deformable link, its strength can be changed by changing materials of construction and/or by changing various geometric properties of the deformable link. Individuals who are skilled in the art would be able to identify numerous other methods to change the effective strength of pins, deformable links, or other activation components.

The present excess flow shutoff valve has been tested successfully at room temperature and at temperatures in the range of 750-900° C., with the trip point set at only twice the operating flow rate, thereby demonstrating that the valve can detect a very small amount of excess flow and activate itself to shut-off the flow. Testing also suggests that it may be feasible to reduce the amount of excess flow required to activate the valve even further without impacting the reliability of the valve.

The present excess flow shutoff valve operates at full fluid temperature and may be installed entirely in-line. This allows for a much more compact design than prior art high temperature excess flow shutoff valves.

The present excess flow shutoff valve can be designed to close with very small applied force. This allows for large orifices for the flow restriction, and consequently low pressure drop through the valve at normal operating conditions.

The present excess flow shutoff valve provides a very good seal, despite oxidation of the sealing surfaces. Testing has confirmed that the present valve is resistant to debris and will seal well in the presence of debris.

The present excess flow shutoff valve provides the optional capability to remotely trip the valve by injecting a small quantity of fluid into the valve at a flow rate that is a very small percentage of the normal operating flow. This optional feature allows the valve to be tripped intentionally when the flow through the valve is less than the set point and it provides the capability to remotely augment the activation force on the valve plug in the event that the valve fails to trip at the set point.

EXAMPLES

Example 1

Breaking Pin Test

A specific three-point bending pin was designed for a valve with a pressure differential across the valve plug of 1.7 kPa during normal operation and 6.9 kPa at the trip condition. With the weight of the plug at 0.9 N (0.2 $lb_f$), the load only varied from $W_{plug}+A \times \Delta P_{operation}$=2.2 N (0.5 $lb_f$) during operation to $W_{plug}+A \times \Delta P_{trip}$=6.2 N (1.4 $lb_f$) at the intended trip point. The cross-sectional area of the second chamber, A, was 7.3 $cm^2$ (1.13 $in^2$). This gave a trip load to operating load ratio of only 2.8 and, therefore, required a pin with a very reliable and predictable breaking strength. To achieve the desired behavior, the pin was made of alumina, with a reported characteristic strength of 330 MPa and Weibull modulus of 10. The pin was 1.016 mm (0.040 in.) in diameter and its outer diameter was machined for good dimensional consistency. The support spacing of the pin (i.e., the second chamber inner diameter) was 30.5 mm (1.20 in.). The calculated probability of failure (i.e. breaking of the pin) at the operating point was 0.00001, or 1 in 100,000 premature trips, and the probability of failure at the trip point was 20%, or 2 in 10 premature trips below the set point. A slightly higher load of 10.3 kPa was required to achieve a probability of failure of 99.9%.

Testing was conducted to verify the pin design. Ten pins were broken at 875° C. in a similar loading configuration to that analyzed. The breaking force was 6.32±0.623 N (1.42±0.14 $lb_f$), which corresponds very closely to the desired 6.87 kPa breaking pressure.

Additional testing was conducted on many pins in actual excess flow shutoff valve configurations. The test rig included the valve plug, circular partition, and breaking pin. The test rig did not include the orifices or valve body as they were not necessary to assess the strength of the pin. These test parts were installed in a pressure vessel at 875° C. that had been pressurized to approximately 68.7 kPa. Flow was allowed to pass over the plug and was vented to atmosphere. The vent flow was controlled to create a pressure drop of 1.7 kPa across the valve plug for a period of time (often several months), after which the flow was increased until the pin broke. Nine pins were tested in this manner. The range in pressure drop across the valve plug at which the pins broke was 7.17±1.3 kPa, which gave a range of breaking force of 6.27±0.93 N. This was very close to the desired breaking load.

Example 2

A Valve Plug with Straight Walls Vs. a Valve Plug with Circumscribing Ribs

The effectiveness with which circumscribing ribs on the valve plug reduce unbalanced and unsteady flow-induced lateral forces on the plug, and thereby reduce the tendency for vibration of the plug and for pushing of the plug against the wall of the second chamber, was evaluated experimentally by comparing the behavior of a straight-walled valve plug to that of ribbed valve plugs in a room temperature test rig using ambient air as the process fluid. All of the valve plugs that were tested, along with their mating partitions, had a circular cross-section. For all of the tests, the axis of the valve plug and the axis of circular partition were oriented vertically, and the valve plug was hung inside the partition from a pin in a three point bending configuration. The tests were conducted by imposing a pressure difference across the plug, typical of the pressure difference that is expected in the range of anticipated operating conditions for the production of oxygen with ion transport membranes, and then observing the behavior of the plug.

Over much of the test range, the straight-walled plug vibrated at audible frequencies. The movement of the plug was generally side-to-side within the second chamber in a swinging or pendulum type motion with the pivot point being the point from which the plug was hanging from the pin. The fact that the plug was restrained to swing in a pendulum motion, necessarily means that the plug imposed a dynamic oscillating force on the pin at the pivot point. Such a force is highly undesirable because it can lead to premature fatigue-induced breaking of a pin-in-bending type activation component. The amplitude of vibration, as detected by the audible loudness of the plug, generally increased with increase in the pressure difference that was imposed across the valve plug.

The straight-walled valve plug was also observed to be held by flow-induced forces in a stationary stable condition (i.e. it would stop vibrating) against the side of the second chamber. This condition occurred when the valve plug was positioned against the side of the second chamber, either by moving off-center the point from which the valve plug hung on the pin or by causing the plug to hang at an angle within the chamber. The condition also occurred spontaneously when vibration caused the point from which the valve plug hung on the pin to shift off-center until the valve plug moved against the wall of the second chamber, and when the amplitude of vibration was sufficiently large and the amplitude of the unbalanced flow-induced forces were sufficiently large to hold the valve plug at an angle with respect to vertical such that the bottom end of the valve plug was against the wall of the second chamber. Any forces or mechanisms which hold the valve plug against the wall of the second chamber are highly undesirable because they can promote seizing or bonding of the valve plug to the partition and/or valve body, particularly in high temperature applications, and thereby prevent the excess flow shutoff valve from functioning properly. The desired condition is for the plug to remain concentrically centered in the second chamber.

The cause of the unbalanced and unsteady flow-induced forces on the straight-walled valve plug is due to an unstable interaction between the fluid that flows through the small radial gap between the valve plug and the second chamber wall, the manner in which the flow resistance through the gap varies significantly around the perimeter of the valve plug as it moves off-center within the second chamber, the relatively small flow area in the gap to accommodate circumferential flow around the plug for the purpose of equalizing pressure around the full perimeter of the valve plug, the dynamic acceleration and deceleration of the valve plug, and the pumping action that occurs when the plug displaces fluid from one side of the gap to the other as it swings back and forth.

Problems due to unbalanced flow-induced forces that are encountered with a straight-walled valve plug are eliminated by using ribbed valve plugs. The circumscribing ribs allow for small radial gaps between the ribs and the wall of the second chamber in order to create the flow restriction necessary to hold bypass flow around the plug to an acceptable level, and at the same time, the ribs create a large void space between the valve plug and the second chamber wall to accommodate circumferential flow around the plug and allow for very effective pressure equalization around the full perimeter of the valve plug. Equalizing the pressure around the full perimeter of the valve plug in this way eliminates the unbalanced flow-induced forces that cause the plug to vibrate and/or to be held against the side of the second chamber.

The effectiveness of the ribbed valve plug design was demonstrated experimentally. Several different ribbed designs were tested. In all cases, plug vibration was almost undetectable, in contrast with the relatively violent vibration of the straight-walled plug. In addition, it was discovered that desirable flow-induced forces naturally exist which hold the ribbed valve plug concentrically centered in the second chamber. Even when the ribbed valve plug intentionally was placed, or pushed, off-center, these forces naturally tended to push the plug back into center. This is in contrast to a straight-walled plug in which flow-induced forces tended to push the plug off-center.

Three valve plug designs were also tested at 875° C. and 68.7 kPa in the test rig described above: a 25.400 mm long straight-walled valve plug with a 0.127 mm. radial clearance to the inside surface of a 30.480 mm inside diameter circular partition; a 24.357 mm long two-ribbed plug with a 0.254 mm radial clearance to the inside surface of a 30.480 mm inside diameter circular partition; and a 25.400 mm long four-ribbed plug with a 0.381 mm radial clearance to the inside surface of a 30.734 mm inside diameter circular partition. All of the plugs were solid (i.e. not hollow). The straight-walled plug seized in the second chamber and did not close when valve activation was attempted. A total of nine tests were conducted with ribbed valve plugs, with as much as four months operating time, and all of the ribbed valve plugs successfully closed when the valves were activated. Other plugs, with more or less ribs, different rib geometry, or different radial clearances may be equally suitable.

Valve plugs having non-circular cross-sections were not tested.

Example 3

Full Scale Testing

Several full scale tests of the excess flow shutoff valve were conducted. Two different excess flow shutoff valves were used in various configurations, as detailed below. All tests were nominally conducted at 41.4 kPa and 875° C. in air or oxygen service with the valve under external pressure. All tests used 29.972 mm diameter by 24.357 mm long two-ribbed solid plugs with a 0.254 mm radial clearance to the cylinder and a 0.635 mm diameter gold gasket with a round cross-section as the sealing element. The plugs and the cylinders were Hastelloy® X, the valve bodies and covers were Incoloy® 800H. The activation components were alumina pins in three-point bending.

Figure 16:
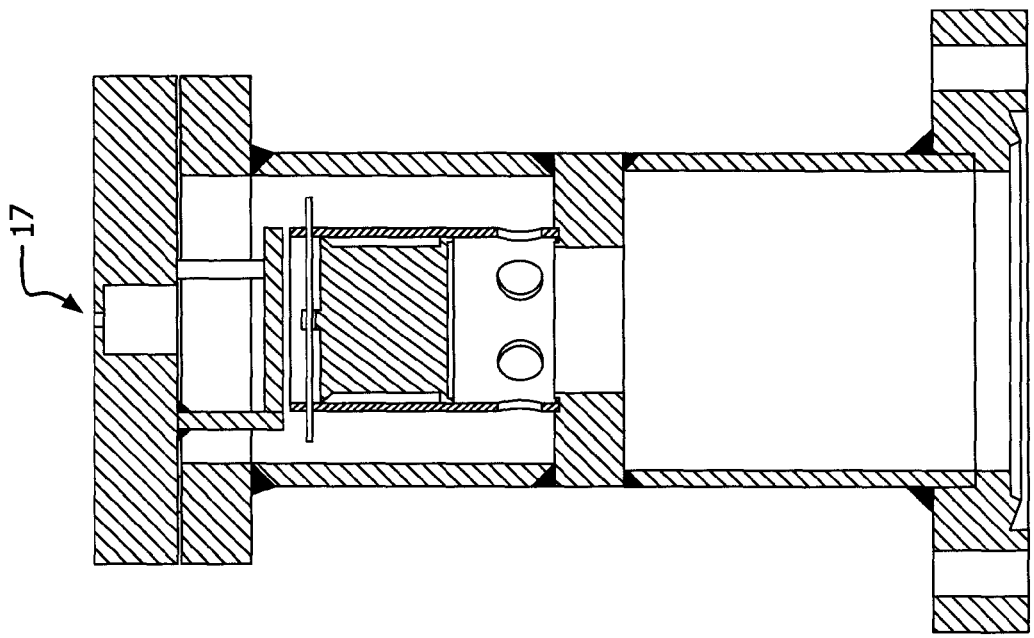
FIG. 16 illustrates a cross-sectional view through an excess flow shutoff valve test unit configured with an orifice on the upstream end.

Test Valve #1 had six 11.4 mm diameter orifices designed for an expected pressure drop of 1.72 kPa at the normal operating flow rate of 31.5 normal cubic meters per hour ($Nm^3/h$) and 6.9 kPa pressure drop at the trip point flow rate of 63.1 $Nm^3/h$. It is estimated that 3% of the flow will bypass the orifices by flowing over the valve plug. The pin, in 3 point bending, and which was sized to break at 6.9 kPa differential pressure, was 1 mm diameter by 30.5 mm effective length. This valve was tested with air fed through an orifice 17 on the upstream end, as shown in FIG. 16. The flow rate through the valve was adjusted by changing the external air pressure.

Test Valve #1 was operated for 7 days at 15.8 $Nm^3/h$, followed by 1 day at 31.5 $Nm^3/h$. The test was then shut down for inspection and taken back to conditions for a brief time before the test was terminated. The intermediate and post-test inspections showed no signs of wear or damage to the pin. The gold gasket was found to be clean, with no evidence of debris collecting in the groove around the gasket. This test demonstrated that the valve could operate at normal conditions without spurious trips due to flow induced vibration of the valve plug.

Test Valve #2 had six 8.13 mm diameter orifices designed for an expected pressure drop of 1.72 kPa at the normal operating flow rate of 15.8 $Nm^3/h$ and 5.2 kPa pressure drop at the trip point flow rate of 27.3 $Nm^3/h$. It is estimated that 5% of the flow will bypass the orifices by flowing over the valve plug. The pin, which was sized to break at 5.2 kPa differential pressure, was 0.94 mm diameter by 30.5 mm effective length. This valve was tested in several configurations.

Test Valve #2 was first run with air fed through an orifice on the upstream end as shown in FIG. 16, similar to the test conducted on Valve #1. The valve was operated at 15.8 Nm³/h for 7 days, after which the flow was increased until the valve tripped. Due to backpressure in the system, the pressure in the valve increased from 41.4 kPa to 51.7 kPa as the flow was ramped; when adjusted for this increase in operating pressure and the resulting increase in density, the expected trip point flow rate increased to 34.2 Nm³/h. The valve tripped at just over 31.5 Nm³/h. After the valve closed, there was no measureable leakage past the gasket.

The aforementioned test was repeated a second time with similar results. The valve was tripped shortly after startup. It tripped at a flow rate of 36.1 Nm³/h and a pressure of 60 kPa. Adjusted for this higher pressure, the expected trip point of the valve was 39.7 Nm³/h. These two tests demonstrated that the valve closed very near to the design trip point.

Figure 17:
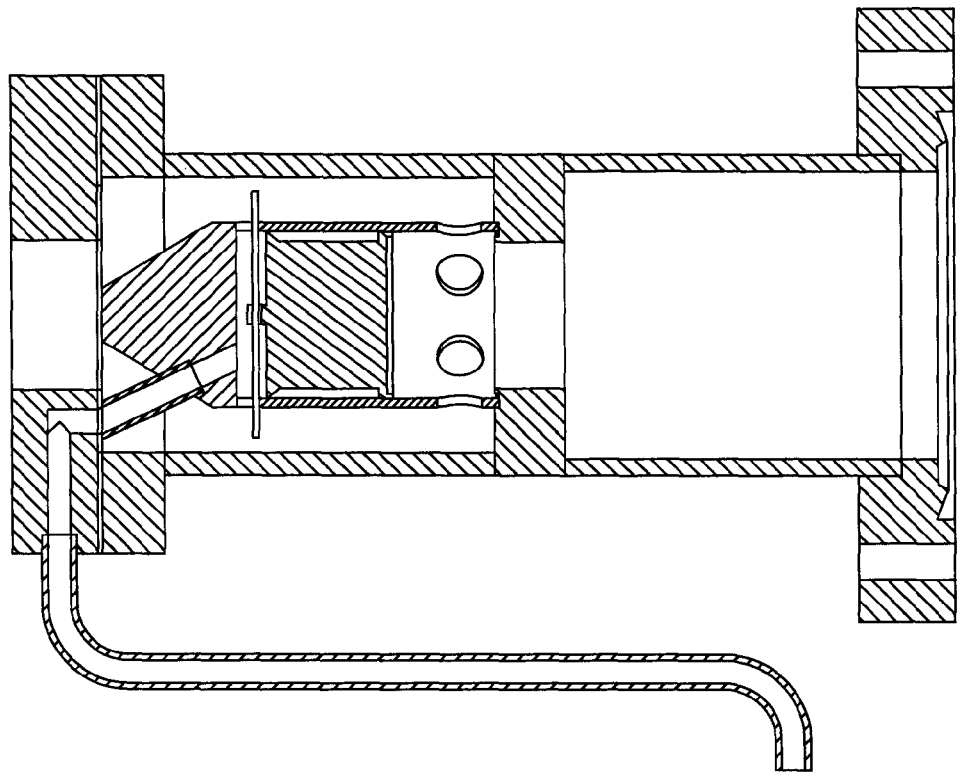
FIG. 17 illustrates a cross-sectional view through an excess flow shutoff valve test unit configured for use with an ion transport membrane module.

Test Valve #2 was then reconfigured to the geometry shown in FIG. 17 to run downstream of ion transport membrane modules that produce oxygen. Three tests were conducted using ion transport membrane modules.

In the first test, the valve was run for 2 days with a flow of 5.4-11.8 Nm³/h product flow. The valve was tripped by injecting 13.8 Nm³/h of nitrogen (versus 13.1 Nm³/h predicted) directly above the plug through the trip gas injection passage.

The second test ran for about 8 days, followed by two thermal cycles from 875° C. to about ambient temperature and back to 875° C., and a further 4 days of operation at 875° C. before the valve was intentionally tripped by injecting a small volume of high pressure gas into the trip gas injection passage.

The final test ran for a short duration, after which the valve tripped when the ion transport membrane was caused to fail.

This final series of tests demonstrated that the excess flow valve could be tripped remotely by injecting gas through the injection passage, and most importantly, that it would successfully close when an upstream component failed.

We claim:

1. An excess flow shutoff valve comprising:
    a valve body defining an internal volume and having an inlet port and an outlet port;
    a valve plug having an upstream end and a downstream end, the valve plug movable within the valve body from a position that permits fluid to flow from the inlet port to the outlet port to a position that blocks fluid from flowing from the inlet port to the outlet port, the valve plug movable from the position that permits fluid to flow from the inlet port to the outlet port to the position that blocks fluid from flowing from the inlet port to the outlet port upon activation of an activation component;
    a partition disposed within the valve body, the partition forming a first chamber and a second chamber within the internal volume of the valve body, wherein the valve plug is disposed within the second chamber when the valve plug is in the position that permits fluid to flow from the inlet port to the outlet port; and
    the activation component disposed within the valve body and operatively connected to the valve plug to hold the valve plug in place within the second chamber in the position that permits fluid to flow from the inlet port to the outlet port;
    wherein at least one of the valve body and the partition define one or more orifices for fluid flow from the first chamber to the second chamber when the valve plug is in the position that permits fluid to flow from the inlet port to the outlet port, the one or more orifices at a position downstream of the downstream end of the valve plug when the valve plug is in the position that permits fluid to flow from the inlet port to the outlet port wherein the one or more orifices create a pressure difference between the upstream end of the valve plug and the downstream end of the valve plug when fluid flows through the valve body, wherein the pressure difference is less than a target pressure difference for activating the activation component when the fluid flows through the valve body at a lower rate, which is less than a target flow rate, and the pressure difference exceeds the target pressure difference for activating the activation component when the fluid flows through the valve body at a higher rate, which is greater than the target flow rate;
    wherein the activation component comprises a pin, the pin loaded in bending, the pin having a strength such that the pin will break upon the pressure difference exceeding the target pressure difference occurring between the upstream end of the valve plug and the downstream end of the valve plug, wherein the pin holds the valve plug in place within the valve body when the valve plug is in the position that permits fluid to flow from the inlet port to the outlet port, wherein upon the pin breaking, the valve plug is caused to move to the position that blocks fluid from flowing from the inlet port to the outlet port.

2. The excess flow valve of claim 1 wherein the first chamber is defined by at least or by the inlet port, a portion of an inner surface of the valve body, a first surface of the partition, and the upstream end of the valve plug when the valve plug is in the position that permits fluid to flow from the inlet port to the outlet port, and the second chamber is defined by at least the outlet port, a second surface of the partition, and the upstream end of the valve plug when the valve plug is in the position that permits fluid to flow from the inlet port to the outlet port.

3. The excess flow valve of claim 2 wherein the second chamber is further defined by a second portion of the inner surface of the valve body.

4. The excess flow valve of claim 1 wherein the second chamber is formed within the partition, the second chamber defined by at least or by an inner surface of the partition, the outlet port, and the upstream end of the valve plug when the valve plug is in the position that permits fluid to flow from the inlet port to the outlet port.

5. The excess flow shutoff valve of claim 1 wherein the activation component comprises a pin and a deformable link, the pin having a strength such that the pin will break only upon the pressure difference exceeding the target pressure difference occurring between the upstream end of the valve plug and the downstream end of the valve plug, the deformable link having a creep characteristic such that the deformable link will creep when the pressure difference exceeds a second target pressure difference occurring between the upstream end of the valve plug and the downstream end of the valve plug,
    wherein the pin and the deformable link are operatively disposed such that the pin initially holds the valve plug in place within the valve body in the position that permits fluid to flow from the inlet port to the outlet port, wherein upon the pin breaking, the valve plug is restrained by the deformable link, wherein upon the deformable link creeping, the valve plug is caused to move to the position that blocks fluid from flowing from the inlet port to the outlet port within a target time period.

6. The excess flow shutoff valve of claim 1 further comprising:
a flow deflector disposed within the valve body, the flow deflector positioned in the first chamber downstream of the inlet port of the valve body and upstream of the upstream end of the valve plug for deflecting fluid that enters through the inlet port of the valve body away from the upstream end of the valve plug.

7. The excess flow valve of claim 1 wherein the partition has a side facing the valve plug and a side facing away from the valve plug, and wherein the partition comprises a sleeve forming at least a portion of the side facing away from the valve plug, and the one or more orifices are formed in the sleeve.

8. The excess flow shutoff valve of claim 1 wherein the pin is supported by the partition when the pin holds the valve plug in place within the valve body in the position that permits fluid to flow from the inlet port to the outlet port.

9. The excess flow shutoff valve of claim 8 wherein the pin is in a 3 point bending configuration.

10. The excess flow shutoff valve of claim 8 further comprising a spreader beam mechanically connecting the valve plug to the pin thereby putting the pin in a 4 point bending configuration.

11. The excess flow shutoff valve of claim 1 further comprising a gasket, the gasket positioned to form a seal between the valve plug and at least one of the valve body and the partition when the valve plug is in the position that prevents fluid from flowing from the inlet port to the outlet port.

12. The excess flow shutoff valve of claim 1 further comprising:
a gasket positioned in a groove in the valve plug;
a valve seat; and
a second gasket proximate the outlet port of the valve body;
wherein the valve seat is positioned to form a seal with the gasket when the valve plug is in the position that prevents fluid from flowing from the inlet port to the outlet port, and wherein the second gasket is positioned between the valve seat and the valve body to provide a seal between the valve seat and the valve body.

13. The excess flow shutoff valve of claim 1 further comprising an activating fluid injection passage disposed for injecting an activating fluid at the upstream end of the valve plug.

14. The excess flow shutoff valve of claim 13 wherein the upstream end of the valve plug, a flow deflector, and the partition form a space disposed for receiving the activating fluid from the activating fluid injection passage, and the partition and the deflector form a flow-restricting gap therebetween disposed to restrict flow of the activating fluid out of the space.

15. The excess flow shutoff valve of claim 1 wherein the valve plug has one or more circumscribing ribs.

16. The excess flow shutoff valve of claim 1 wherein the valve plug is caused to move to the position that blocks fluid from flowing from the inlet port to the outlet port by gravitational force.

* * * * *